United States Patent
Svendsen et al.

(10) Patent No.: US 7,441,298 B2
(45) Date of Patent: Oct. 28, 2008

(54) COVERAGE ROBOT MOBILITY

(75) Inventors: Selma Svendsen, Andover, MA (US); Daniel N. Ozick, Newton, MA (US); Christopher M. Casey, Lexington, MA (US); Deepak Ramesh Kapoor, Cranston, RI (US); Tony L. Campbell, Pepperell, MA (US); Chikyung Won, Tewksbury, MA (US); Christopher John Morse, Malden, MA (US); Scott Thomas Burnett, Windham, NH (US)

(73) Assignee: iRobot Corporation, Bedford, MA (US)

( * ) Notice: Subject to any disclaimer, the term of this patent is extended or adjusted under 35 U.S.C. 154(b) by 0 days.

(21) Appl. No.: 11/633,885

(22) Filed: Dec. 4, 2006

(65) Prior Publication Data

US 2007/0234492 A1 Oct. 11, 2007

Related U.S. Application Data

(60) Provisional application No. 60/741,442, filed on Dec. 2, 2005.

(51) Int. Cl.
*A47L 5/00* (2006.01)
*G06F 19/00* (2006.01)

(52) U.S. Cl. .............................. 15/49.1; 15/319; 15/339; 700/245

(58) Field of Classification Search .................. 15/49.1, 15/319, 339; 342/385, 417; 701/23, 24, 701/41, 300, 301; 700/245
See application file for complete search history.

(56) References Cited

U.S. PATENT DOCUMENTS

| | | | |
|---|---|---|---|
| 3,457,575 A | 7/1969 | Bienek | |
| 3,550,714 A | 12/1970 | Bellinger | |
| 3,674,316 A | 7/1972 | De Brey | |

(Continued)

FOREIGN PATENT DOCUMENTS

EP 437024 A1 7/1991

(Continued)

OTHER PUBLICATIONS

Cameron Morland, *Autonomous Lawn Mower Control*, Jul. 24, 2002.

(Continued)

*Primary Examiner*—Joseph J. Hail, III
*Assistant Examiner*—Anthony Ojini
(74) *Attorney, Agent, or Firm*—Fish & Richardson P.C.

(57) ABSTRACT

An autonomous coverage robot includes a chassis, a drive system to maneuver the robot, an edge cleaning head carried, and a controller. The controller is configured to monitor motor current associated with the edge cleaning head and to reverse bias the edge cleaning head motor in response to an elevated motor current, while continuing to maneuver the robot across the floor. In another aspect, an autonomous coverage robot includes a drive system, a bump sensor, and a proximity sensor. The drive system is configured to reduce a speed setting in response to a signal from the proximity sensor indicating detection of a potential obstacle in a forward direction, while continuing to advance the robot according to a heading setting. Furthermore, the drive system is configured to alter the heading setting in response to a signal received from the bump sensor indicating contact with an obstacle.

32 Claims, 21 Drawing Sheets

U.S. PATENT DOCUMENTS

| | | |
|---|---|---|
| 3,756,667 A | 9/1973 | Bombardier |
| 3,809,004 A | 5/1974 | Leonheart |
| 3,937,174 A | 2/1976 | Haaga |
| 4,099,284 A | 7/1978 | Shinozaki et al. |
| 4,119,900 A | 10/1978 | Kremnitz |
| D258,901 S | 4/1981 | Keyworth |
| 4,306,329 A | 12/1981 | Yokoi |
| 4,369,543 A | 1/1983 | Chen et al. |
| 4,492,058 A | 1/1985 | Goldfarb |
| 4,513,469 A | 4/1985 | Godfrey et al. |
| D278,732 S | 5/1985 | Ohkado |
| 4,556,313 A | 12/1985 | Miller, Jr. et al. |
| 4,618,213 A | 10/1986 | Chen |
| 4,620,285 A | 10/1986 | Perdue |
| 4,626,995 A | 12/1986 | Lofgren et al. |
| 4,674,048 A | 6/1987 | Okumura |
| 4,679,152 A | 7/1987 | Perdue |
| 4,696,074 A | 9/1987 | Cavalli et al. |
| D292,223 S | 10/1987 | Trumbull |
| 4,700,301 A | 10/1987 | Dyke |
| 4,700,427 A | 10/1987 | Knepper |
| 4,716,621 A | 1/1988 | Zoni |
| 4,733,430 A | 3/1988 | Westergren |
| 4,733,431 A | 3/1988 | Martin |
| 4,756,049 A | 7/1988 | Uehara |
| 4,777,416 A | 10/1988 | George, II et al. |
| D298,766 S | 11/1988 | Tanno |
| 4,782,550 A | 11/1988 | Jacobs |
| 4,813,906 A | 3/1989 | Matsuyama |
| 4,815,157 A | 3/1989 | Tsuchiya |
| 4,829,626 A | 5/1989 | Harkonen |
| 4,832,098 A | 5/1989 | Palinkas |
| 4,854,000 A | 8/1989 | Takimoto |
| 4,887,415 A | 12/1989 | Martin |
| 4,893,025 A | 1/1990 | Lee |
| 4,901,394 A | 2/1990 | Nakamura et al. |
| 4,912,643 A | 3/1990 | Beirne |
| 4,918,441 A | 4/1990 | Bohman |
| 4,919,224 A | 4/1990 | Shyu et al. |
| 4,919,489 A | 4/1990 | Kopsco |
| 4,933,864 A | 6/1990 | Evans et al. |
| 4,956,891 A | 9/1990 | Wulff |
| 4,962,453 A | 10/1990 | Pong et al. |
| 4,971,591 A | 11/1990 | Raviv |
| 4,974,283 A | 12/1990 | Holsten et al. |
| 4,977,639 A | 12/1990 | Takahashi et al. |
| 5,001,635 A | 3/1991 | Yasutomi et al. |
| 5,002,145 A | 3/1991 | Waqkaumi et al. |
| 5,022,812 A | 6/1991 | Coughlan et al. |
| D318,500 S | 7/1991 | Malewicki |
| 5,033,291 A | 7/1991 | Podoloff et al. |
| 5,062,819 A | 11/1991 | Mallory |
| 5,086,535 A | 2/1992 | Grossmeyer et al. |
| 5,093,955 A | 3/1992 | Blehert et al. |
| 5,094,311 A | 3/1992 | Akeel |
| 5,105,502 A | 4/1992 | Takashima |
| 5,109,566 A | 5/1992 | Kobayashi et al. |
| 5,115,538 A | 5/1992 | Cochran et al. |
| 5,136,750 A | 8/1992 | Takashima et al. |
| 5,142,985 A | 9/1992 | Stearns |
| 5,163,202 A | 11/1992 | Kawakami et al. |
| 5,165,064 A | 11/1992 | Mattaboni |
| 5,173,881 A | 12/1992 | Sindle |
| 5,204,814 A | 4/1993 | Noonan et al. |
| 5,239,720 A | 8/1993 | Wood et al. |
| 5,261,139 A | 11/1993 | Lewis |
| 5,277,064 A | 1/1994 | Knigga et al. |
| 5,279,672 A | 1/1994 | Belker, Jr. et al. |
| 5,284,522 A | 2/1994 | Kobayashi et al. |
| 5,293,955 A | 3/1994 | Lee |
| 5,303,448 A | 4/1994 | Hennessey et al. |
| 5,310,379 A | 5/1994 | Hippely |
| 5,319,828 A | 6/1994 | Waldhauser et al. |
| 5,321,614 A | 6/1994 | Ashworth |
| 5,324,948 A | 6/1994 | Dudar et al. |
| 5,341,540 A | 8/1994 | Soupert et al. |
| 5,353,224 A | 10/1994 | Lee et al. |
| 5,363,935 A | 11/1994 | Schempf |
| 5,369,347 A | 11/1994 | Yoo |
| 5,369,838 A | 12/1994 | Wood et al. |
| 5,410,479 A | 4/1995 | Coker |
| 5,435,405 A | 7/1995 | Schempf |
| 5,440,216 A | 8/1995 | Kim |
| 5,444,965 A | 8/1995 | Colens |
| 5,446,356 A | 8/1995 | Kim |
| 5,451,135 A | 9/1995 | Schempf |
| 5,454,129 A | 10/1995 | Kell |
| 5,455,982 A | 10/1995 | Armstrong et al. |
| 5,465,525 A | 11/1995 | Mifune et al. |
| 5,467,273 A | 11/1995 | Faibish et al. |
| 5,497,529 A | 3/1996 | Boesi |
| 5,505,072 A | 4/1996 | Oreper |
| 5,507,067 A | 4/1996 | Hoekstra et al. |
| 5,515,572 A | 5/1996 | Hoekstra et al. |
| 5,534,762 A | 7/1996 | Kim |
| 5,537,017 A | 7/1996 | Feiten et al. |
| 5,539,953 A | 7/1996 | Kurz |
| 5,542,146 A | 8/1996 | Hoekstra et al. |
| 5,548,511 A | 8/1996 | Bancroft |
| 5,551,525 A | 9/1996 | Pack et al. |
| 5,553,349 A | 9/1996 | Kilstrom et al. |
| 5,555,587 A | 9/1996 | Guha |
| 5,560,077 A | 10/1996 | Crotchett |
| 5,568,589 A | 10/1996 | Hwang |
| D375,592 S | 11/1996 | Ljunggren |
| 5,611,106 A | 3/1997 | Wulff |
| 5,611,108 A | 3/1997 | Knowlton et al. |
| 5,613,261 A | 3/1997 | Kawakami et al. |
| 5,621,291 A | 4/1997 | Lee |
| 5,622,236 A | 4/1997 | Azumi et al. |
| 5,634,237 A | 6/1997 | Paranjpe |
| 5,634,239 A | 6/1997 | Tuvin et al. |
| 5,650,702 A | 7/1997 | Azumi |
| 5,652,489 A | 7/1997 | Kawakami |
| 5,682,313 A | 10/1997 | Edlund et al. |
| 5,709,007 A | 1/1998 | Chiang |
| 5,717,169 A | 2/1998 | Liang et al. |
| 5,735,959 A | 4/1998 | Kubo et al. |
| 5,756,904 A | 5/1998 | Oreper |
| 5,761,762 A | 6/1998 | Kubo et al. |
| 5,777,596 A | 7/1998 | Herbert |
| 5,781,960 A | 7/1998 | Kilstrom et al. |
| 5,787,545 A | 8/1998 | Colens |
| 5,794,297 A | 8/1998 | Muta |
| 5,812,267 A | 9/1998 | Everett, Jr. et al. |
| 5,819,008 A | 10/1998 | Asama et al. |
| 5,831,597 A | 11/1998 | West et al. |
| 5,839,156 A | 11/1998 | Park et al. |
| 5,839,532 A | 11/1998 | Yoshiji |
| 5,841,259 A | 11/1998 | Kim et al. |
| 5,867,800 A | 2/1999 | Leif |
| 5,905,209 A | 5/1999 | Oreper |
| 5,916,008 A | 6/1999 | Wong |
| 5,926,909 A | 7/1999 | McGee |
| 5,933,102 A | 8/1999 | Miller |
| 5,933,913 A | 8/1999 | Wright et al. |
| 5,935,179 A * | 8/1999 | Kleiner et al. ............ 701/23 |
| 5,940,927 A | 8/1999 | Haegermarck et al. |
| 5,940,930 A | 8/1999 | Oh et al. |
| 5,942,869 A | 8/1999 | Katou |
| 5,943,730 A | 8/1999 | Boomgaarden |
| 5,943,733 A | 8/1999 | Tagliaferri |
| 5,959,423 A | 9/1999 | Nakanishi et al. |
| 5,968,281 A | 10/1999 | Wright et al. |

| | | | | | | |
|---|---|---|---|---|---|---|
| 5,983,448 | A | 11/1999 | Wright et al. | 7,057,120 | B2 | 6/2006 | Ma et al. |
| 5,984,880 | A | 11/1999 | Lander | 7,085,624 | B2 | 8/2006 | Aldred et al. |
| 5,989,700 | A | 11/1999 | Krivopal | 7,206,677 | B2 | 4/2007 | Hulden |
| 5,991,951 | A | 11/1999 | Kubo | 2001/0020200 | A1 | 9/2001 | Das et al. |
| 6,000,088 | A | 12/1999 | Wright et al. | 2001/0025183 | A1 | 9/2001 | Shahidi |
| 6,032,542 | A | 3/2000 | Warnick | 2001/0047231 | A1 | 11/2001 | Peless et al. |
| 6,041,471 | A | 3/2000 | Charky et al. | 2002/0011813 | A1 | 1/2002 | Koselka et al. |
| 6,049,620 | A | 4/2000 | Dickinson et al. | 2002/0016649 | A1 | 2/2002 | Jones |
| 6,055,702 | A | 5/2000 | Imamura | 2002/0120364 | A1 | 8/2002 | Colens |
| 6,065,182 | A | 5/2000 | Wright et al. | 2002/0156556 | A1 | 10/2002 | Ruffner |
| 6,076,025 | A | 6/2000 | Ueno | 2002/0173877 | A1 | 11/2002 | Zweig |
| 6,076,226 | A | 6/2000 | Reed | 2003/0019071 | A1 | 1/2003 | Field et al. |
| 6,088,020 | A | 7/2000 | Mor | 2003/0025472 | A1 | 2/2003 | Jones et al. |
| 6,099,091 | A | 8/2000 | Campbell | 2003/0060928 | A1 | 3/2003 | Abramson et al. |
| 6,101,671 | A | 8/2000 | Wright et al. | 2003/0067451 | A1 | 4/2003 | Tagg |
| 6,108,269 | A | 8/2000 | Kabel | 2003/0120389 | A1 | 6/2003 | Abramson et al. |
| 6,125,498 | A | 10/2000 | Roberts et al. | 2003/0137268 | A1 | 7/2003 | Papanikolopoulos et al. |
| 6,142,252 | A | 11/2000 | Kinto et al. | 2003/0192144 | A1 | 10/2003 | Song et al. |
| 6,167,587 | B1 | 1/2001 | Kasper et al. | 2003/0216834 | A1 | 11/2003 | Allard |
| 6,192,548 | B1 | 2/2001 | Huffman | 2003/0233177 | A1 | 12/2003 | Johnson et al. |
| 6,226,830 | B1 | 5/2001 | Hendriks et al. | 2004/0020000 | A1 | 2/2004 | Jones |
| 6,230,362 | B1 | 5/2001 | Kasper et al. | 2004/0030448 | A1 | 2/2004 | Solomon |
| 6,243,913 | B1 | 6/2001 | Frank et al. | 2004/0030449 | A1 | 2/2004 | Solomon |
| 6,259,979 | B1 | 7/2001 | Holmquist | 2004/0030450 | A1 | 2/2004 | Solomon |
| 6,263,539 | B1 | 7/2001 | Baig | 2004/0030571 | A1 | 2/2004 | Solomon |
| 6,272,936 | B1 | 8/2001 | Oreper | 2004/0031113 | A1 | 2/2004 | Wosewick et al. |
| 6,327,741 | B1 | 12/2001 | Reed | 2004/0049877 | A1 | 3/2004 | Jones et al. |
| 6,370,453 | B2 | 4/2002 | Sommer | 2004/0068351 | A1 | 4/2004 | Solomon |
| 6,400,048 | B1 | 6/2002 | Nishimura | 2004/0068415 | A1 | 4/2004 | Solomon |
| 6,401,294 | B2 | 6/2002 | Kasper | 2004/0068416 | A1 | 4/2004 | Solomon |
| 6,412,141 | B2 | 7/2002 | Kasper et al. | 2004/0076324 | A1 | 4/2004 | Burl et al. |
| 6,437,227 | B1 | 8/2002 | Theimer | 2004/0088079 | A1 | 5/2004 | Lavarec et al. |
| 6,442,476 | B1 | 8/2002 | Poropat | 2004/0111184 | A1 | 6/2004 | Chiappetta et al. |
| 6,444,003 | B1 | 9/2002 | Sutcliffe | 2004/0117064 | A1* | 6/2004 | McDonald ................. 700/245 |
| 6,481,515 | B1 | 11/2002 | Kirkpatrick et al. | 2004/0134336 | A1 | 7/2004 | Solomon |
| 6,493,612 | B1 | 12/2002 | Bisset | 2004/0134337 | A1 | 7/2004 | Solomon |
| 6,493,613 | B2 | 12/2002 | Peless et al. | 2004/0148731 | A1 | 8/2004 | Damman et al. |
| 6,496,754 | B2 | 12/2002 | Song et al. | 2004/0156541 | A1 | 8/2004 | Jeon et al. |
| 6,496,755 | B2 | 12/2002 | Wallach et al. | 2004/0158357 | A1 | 8/2004 | Lee et al. |
| 6,504,610 | B1 | 1/2003 | Bauer | 2004/0200505 | A1 | 10/2004 | Taylor et al. |
| 6,525,509 | B1 | 2/2003 | Petersson et al. | 2004/0204792 | A1 | 10/2004 | Taylor et al. |
| 6,532,404 | B2 | 3/2003 | Colens | 2004/0211444 | A1 | 10/2004 | Taylor et al. |
| D474,312 | S | 5/2003 | Stephens | 2004/0236468 | A1 | 11/2004 | Taylor et al. |
| 6,571,415 | B2 | 6/2003 | Gerber et al. | 2004/0244138 | A1 | 12/2004 | Taylor et al. |
| 6,571,422 | B1 | 6/2003 | Gordon | 2005/0000543 | A1 | 1/2005 | Taylor et al. |
| 6,574,536 | B1 | 6/2003 | Kawagoe et al. | 2005/0010331 | A1 | 1/2005 | Taylor et al. |
| 6,580,246 | B2 | 6/2003 | Jacobs | 2005/0021181 | A1* | 1/2005 | Kim et al. .................. 700/245 |
| 6,601,265 | B1 | 8/2003 | Burlington | 2005/0067994 | A1 | 3/2005 | Jones |
| 6,605,156 | B1 | 8/2003 | Clark et al. | 2005/0156562 | A1 | 7/2005 | Cohen et al. |
| 6,611,120 | B2 | 8/2003 | Song et al. | 2005/0166354 | A1 | 8/2005 | Uehigashi |
| 6,611,738 | B2 | 8/2003 | Ruffner | 2005/0204717 | A1 | 9/2005 | Colens |
| 6,658,693 | B1 | 12/2003 | Reed, Jr. | 2005/0251292 | A1 | 11/2005 | Casey et al. |
| 6,671,592 | B1 | 12/2003 | Bisset et al. | 2006/0010638 | A1 | 1/2006 | Shimizu |
| 6,690,134 | B1 | 2/2004 | Jones et al. | 2006/0060216 | A1 | 3/2006 | Woo |
| 6,741,054 | B2 | 5/2004 | Koselka et al. | 2006/0089765 | A1 | 4/2006 | Pack et al. |
| 6,748,297 | B2 | 6/2004 | Song et al. | 2006/0190133 | A1* | 8/2006 | Konandreas et al. ........ 700/245 |
| 6,756,703 | B2 | 6/2004 | Chang | 2007/0244610 | A1* | 10/2007 | Ozick et al. ................. 701/23 |
| 6,781,338 | B2 | 8/2004 | Jones et al. | | | | |
| 6,809,490 | B2 | 10/2004 | Jones et al. | | FOREIGN PATENT DOCUMENTS | | |
| 6,830,120 | B1 | 12/2004 | Yashima et al. | | | | |
| 6,841,963 | B2 | 1/2005 | Song et al. | EP | 0 861 629 | 9/1998 | |
| 6,883,201 | B2* | 4/2005 | Jones et al. .................. 15/319 | EP | 0 930 040 | 7/1999 | |
| 6,901,624 | B2 | 6/2005 | Mori et al. | EP | 1 331 537 A1 | 7/2003 | |
| D510,066 | S | 9/2005 | Hickey et al. | EP | 1 331 537 B1 | 7/2003 | |
| 6,938,298 | B2 | 9/2005 | Aasen | EP | 1331537 A1 | 7/2003 | |
| 6,956,348 | B2 | 10/2005 | Landry et al. | FR | 2 828 589 | 8/2001 | |
| 6,965,209 | B2 | 11/2005 | Jones et al. | GB | 2 283 838 | 5/1995 | |
| 6,971,140 | B2 | 12/2005 | Kim | GB | 2 404 330 | 2/2005 | |
| 6,985,556 | B2 | 1/2006 | Shanmugavel | JP | 62-120510 | 6/1987 | |
| 6,993,954 | B1 | 2/2006 | George | JP | 62120510 A2 | 6/1987 | |
| 6,999,850 | B2 | 2/2006 | McDonald | JP | 62-154008 | 7/1987 | |
| 7,024,278 | B2 | 4/2006 | Chiappetta et al. | JP | 62154008 | 7/1987 | |
| 7,030,768 | B2 | 4/2006 | Wanie | JP | 63-183032 | 7/1988 | |

| | | |
|---|---|---|
| JP | 63-241610 | 10/1988 |
| JP | 2-6312 | 1/1990 |
| JP | 2026312 A2 | 1/1990 |
| JP | 03-051023 | 3/1991 |
| JP | 06-327598 | 11/1994 |
| JP | 7-295636 | 11/1995 |
| JP | 7295636 A2 | 11/1995 |
| JP | 08-089451 | 4/1996 |
| JP | 08-152916 | 6/1996 |
| JP | 9-179625 | 7/1997 |
| JP | 9185410 | 7/1997 |
| JP | 9206258 A2 | 8/1997 |
| JP | 11-508810 | 8/1999 |
| JP | 11508810 T2 | 8/1999 |
| JP | 11-510935 | 9/1999 |
| JP | 11510935 T2 | 9/1999 |
| JP | 2001-258807 | 9/2001 |
| JP | 2001-275908 | 10/2001 |
| JP | 2001-525567 | 12/2001 |
| JP | 2002-78650 | 3/2002 |
| JP | 2002-204768 | 7/2002 |
| JP | 22204768 A2 | 7/2002 |
| JP | 2002-532178 | 10/2002 |
| JP | 3356170 | 10/2002 |
| JP | 2002-323925 | 11/2002 |
| JP | 22323925 A2 | 11/2002 |
| JP | 2002-355206 | 12/2002 |
| JP | 2002-360471 | 12/2002 |
| JP | 2002-360482 | 12/2002 |
| JP | 22360479 A2 | 12/2002 |
| JP | 2003-10076 | 1/2003 |
| JP | 2003-5296 | 2/2003 |
| JP | 2003-036116 | 2/2003 |
| JP | 2003-38401 | 2/2003 |
| JP | 2003-38402 | 2/2003 |
| JP | 2003-505127 | 2/2003 |
| JP | 23052596 A2 | 2/2003 |
| JP | 2003036116 | 2/2003 |
| JP | 2003-061882 | 3/2003 |
| JP | 2003-310489 | 11/2003 |
| WO | WO 95/26512 | 10/1995 |
| WO | WO9526512 A1 | 10/1995 |
| WO | WO 97/15224 | 5/1997 |
| WO | WO 97/40734 | 11/1997 |
| WO | WO 97/41451 | 11/1997 |
| WO | WO9740734 A1 | 11/1997 |
| WO | WO9741451 A1 | 11/1997 |
| WO | WO 99/28800 | 6/1999 |
| WO | WO 99/38056 | 7/1999 |
| WO | WO 99/38237 | 7/1999 |
| WO | WO 99/43250 | 9/1999 |
| WO | WO 00/04430 | 1/2000 |
| WO | WO0004430 A1 | 1/2000 |
| WO | WO0004430 C1 | 4/2000 |
| WO | WO 00/36962 | 6/2000 |
| WO | WO 00/38026 | 6/2000 |
| WO | WO0038026 A1 | 6/2000 |
| WO | WO0038029 A1 | 6/2000 |
| WO | WO 00/78410 | 12/2000 |
| WO | WO 01/06904 | 2/2001 |
| WO | WO 01/06905 | 2/2001 |
| WO | WO0106904 A1 | 2/2001 |
| WO | WO 02/39864 | 5/2002 |
| WO | WO 02/39868 | 5/2002 |
| WO | WO0239868 A1 | 5/2002 |
| WO | WO 02/058527 | 8/2002 |
| WO | WO 02/062194 | 8/2002 |
| WO | WO 02/067744 | 9/2002 |
| WO | WO 02/067745 | 9/2002 |
| WO | WO 02/074150 | 9/2002 |
| WO | WO 02/075356 | 9/2002 |
| WO | WO 02/075469 | 9/2002 |
| WO | WO 02/075470 | 9/2002 |
| WO | WO02067744 A1 | 9/2002 |
| WO | WO02075356 A1 | 9/2002 |
| WO | WO02075469 A1 | 9/2002 |
| WO | WO02075470 A1 | 9/2002 |
| WO | WO 02/101477 | 12/2002 |
| WO | WO02101477 A2 | 12/2002 |
| WO | WO02101477 A3 | 12/2002 |
| WO | WO 03/026474 | 4/2003 |
| WO | WO 03/040845 | 5/2003 |
| WO | WO 03/040846 | 5/2003 |
| WO | WO03040546 A1 | 5/2003 |
| WO | WO 2004/006034 | 1/2004 |
| WO | WO2004004533 A1 | 1/2004 |
| WO | WO2004005956 A1 | 1/2004 |
| WO | WO2004058028 A2 | 1/2004 |
| WO | WO2005077244 A1 | 1/2004 |
| WO | WO2006068403 A1 | 1/2004 |
| WO | WO 2004/025947 | 3/2004 |
| WO | WO 2005/055795 | 6/2005 |
| WO | WO 2005/083541 | 9/2005 |
| WO | 2006/046400 | 5/2007 |

OTHER PUBLICATIONS

Doty, Keith L et al, "Sweep Strategies for a Sensory-Driven, Behavior-Based Vacuum Cleaning Agent" AAAI 1993 Fall Symposium Series Instantiating Real-World Agents Research Triangle Park, Raleigh, NC, Oct. 22-24, 1993, pp. 1-6.

Electrolux designed for the well-lived home, website: http://www.electroluxusa.com/node57.as[?currentURL=node142.asp%3F, acessed Mar. 18, 2005.

eVac Robotic Vacuum S1727 Instruction Manual, Sharper Image Corp, Copyright 2004.

Everyday Robots, website: http://www.everydayrobots.com/index.php?option=content&task=view&id=9, accessed Apr. 20, 2005.

Facts on the Trilobite webpage: "http://trilobiteelectroluxse/presskit_en/node11335asp?print=yes&pressID=" accessed Dec. 12, 2003.

Friendly Robotics Robotic Vacuum RV400-The Robot Store website: http://www.therobotstore.com/s.nl/sc.9/category,-109/it.A/id.43/.f, accessed Apr. 20, 2005.

Gat, Erann, Robust Low-computation Sensor-driven Control for Task-Directed Navigation, Proceedings of the 1991 IEEE, International Conference on Robotics and Automation, Sacramento, California, Apr. 1991, pp. 2484-2489.

Hitachi: News release: The home cleaning robot of the autonomous movement type (experimental machine) is developed, website: http://www.i4u.com/japanreleases/hitachirobot.htm., accessed Mar. 18, 2005.

Kärcher Product Manual Download webpage: "http://wwwkarchercom/bta/downloadenshtml?ACTION=SELECTTEILENR&ID=rc3000&submitButtonName=Select+Product+Manual" and associated pdf file "5959-915enpdf (47 MB) English/English" accessed Jan. 21, 2004.

Karcher RC 3000 Cleaning Robot—user manual Manufacturer: Alfred-Karcher GmbH & Co, Cleaning Systems, Alfred Karcher-Str 28-40, PO Box 160, D-71349 Winnenden, Germany, Dec. 2002.

Kärcher RoboCleaner RC 3000 Product Details webpages: "http://wwwrobocleanerde/english/screen3html" through "... screen6html" accessed Dec. 12, 2003.

Karcher USA, RC3000 Robotic Cleaner, website: http://www.karcher-usa.com/showproducts.php?op=view_prod&param1=143&param2=&param3=, accessed Mar. 18, 2005.

Koolvac Robotic Vacuum Cleaner Owner's Manual, Koolatron, Undated.

NorthStar Low-Cost, Indoor Localization, Evolution robotics, Powering Intelligent Products.

Put Your Roomba . . . On "Automatic" Roomba Timer> Timed Cleaning-Floorvac Robotic Vacuum webpages: http://cgi.ebay.com/ws/eBayISAPI.dll?ViewItem&category=43575198387&rd=1, accessed Apr. 20, 2005.

Put Your Roomba . . . On "Automatic" webpages: "http://www.acomputeredge.com/roomba," accessed Apr. 20, 2005, 5 pgs.

RoboMaid Sweeps Your Floors So You Won't Have To, the Official Site, website: http//www.thereobomaid.com/, acessed Mar. 18, 2005.

Robot Review Samsung Robot Vacuum (VC-RP30W), website: http://www.onrobo.com/reviews/At_Home/Vacuun_Cleaners/on00vcrp30rosam/index.htm, accessed Mar. 18, 2005.

Robotic Vaccum Cleaner-Blue, website: http://www.sharperimage.com/us/en/catalog/productview.jhtml?sku=S1727BLU, accessed Mar. 18, 2005.

Schofield, Monica, "Neither Master nor Slave" A Pratical Study in the Development and Employment of Cleaning Robots, Emerging Technologies and Factory Automation, 1999 Proceedings EFA'99 1999 7th IEEE International Conference on Barcelona, Spain Oct. 18-21, 1999, pp. 1427-1434.

Wired News: Robot Vacs in the House, website: http://www.wired.com/news/print/0,1294,59237,00.html, accessed Mar. 18, 2005.

Zoombot Remote Controlled Vaccum-RV-500 New Roomba 2, website: http://cgi.ebay.com/ws/eBayISAPI.dll?ViewItem&category=43526&item=4373497618&rd=1, accessed Apr. 20, 2005.

Shimoga et al., Touch and force reflection for telepresence surgery, 1994, IEEE, pp. 1049-1050.*.

Autonomous Lawn Care Applications, Conference on Robotics, Authors: Micheal Gregg, Dr. Eric M. Schwartz, Dr. Antonio A. Arroyo—future work includes a mechanism for adjusting cutter height, additional motor and blade for edge cutting.

Sweep Strategies for a Sensory Driven Behavior Based Vacuum Cleaning Agent, Keith L. Doty and Reid R. Harrison.

* cited by examiner

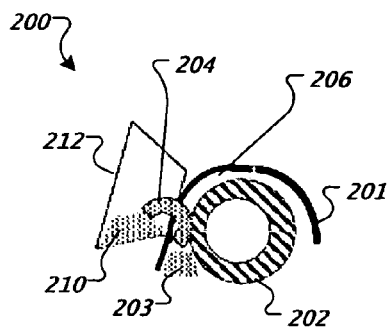
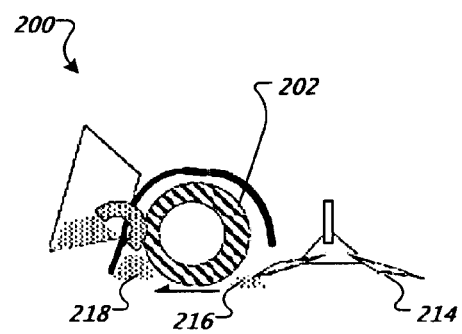
FIG. 17A          FIG. 17B
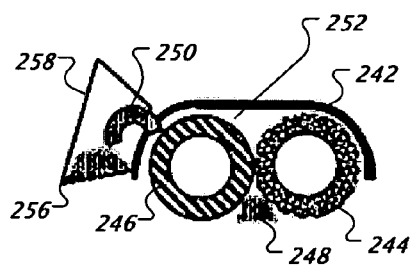
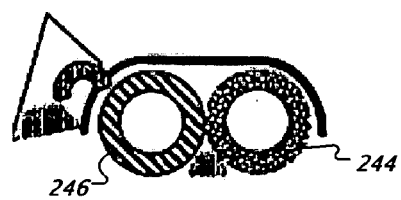
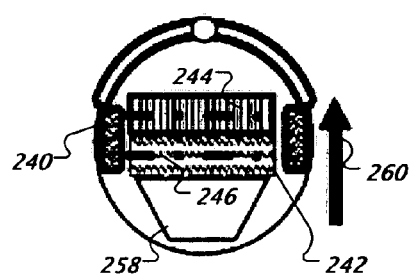
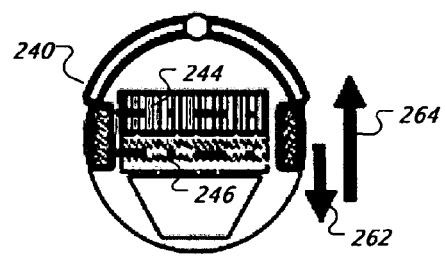
FIG. 17C          FIG. 17D

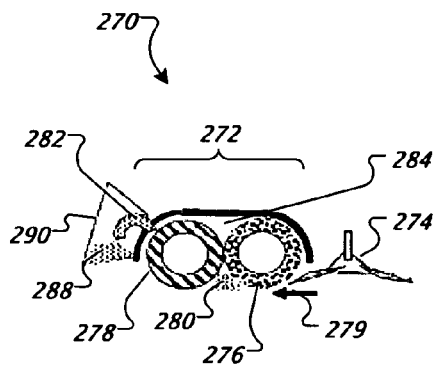
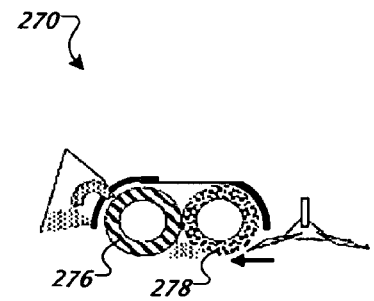
FIG. 17E
FIG. 17F
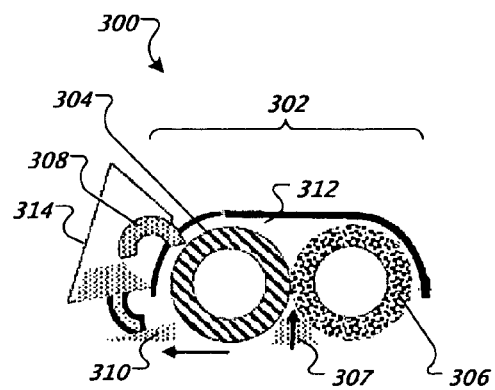
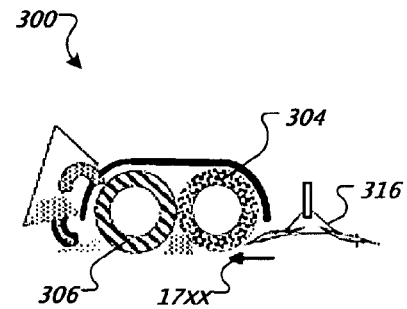
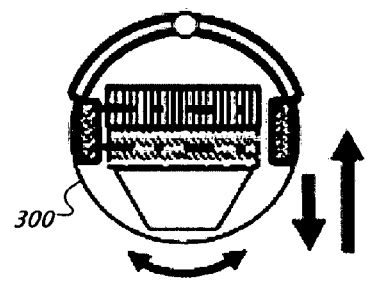
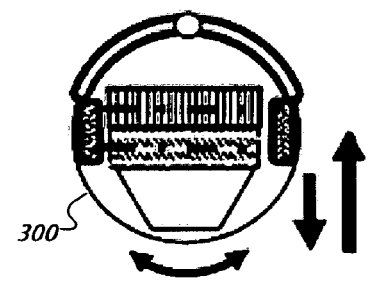
FIG. 17G
FIG. 17H

COVERAGE ROBOT MOBILITY This U.S. patent application claims priority under 35 U.S.C. 119(e) to a U.S. provisional patent application filed on Dec. 2, 2005, entitled "ROBOT NETWORKING, THEMING AND COMMUNICATION SYSTEM" and having assigned Ser. No. 60/741,442, the entire contents of which are hereby incorporated by reference.

TECHNICAL FIELD

This invention relates to robots, and more particularly to autonomous coverage robots.

BACKGROUND

Autonomous robots are robots which can perform desired tasks in unstructured environments without continuous human guidance. Many kinds of robots are autonomous to some degree. Different robots can be autonomous in different ways. An autonomous coverage robot traverses a work surface without continuous human guidance to perform one or more tasks. In the field of home, office and/or consumer-oriented robotics, mobile robots that perform household functions such as vacuum cleaning, floor washing, patrolling, lawn cutting and other such tasks have been widely adopted.

SUMMARY

An autonomous coverage robot will encounter many obstacles while operating. In order to continue operating, the robot will need to continually avoid obstacles, and in cases where trapped by fabric, string, or other entangling soft media, free itself.

In one aspect, an autonomous coverage robot includes a chassis, a drive system mounted on the chassis and configured to maneuver the robot, an edge cleaning head carried by the chassis, and a controller carried by the chassis. The edge cleaning head is driven by an edge cleaning head motor and may rotate about a non-horizontal axis. The edge cleaning head extends beyond a lateral extent of the chassis to engage a floor surface while the robot is maneuvered across the floor. The edge cleaning head may be disposed on or near a peripheral edge of the robot. A brush control process, independent of drive processes, on a controller that controls robot operation is configured to monitor motor current associated with the edge cleaning head. The brush control process on the controller is also configured to reverse bias the edge cleaning head motor in a direction opposite to the previous cleaning direction after detecting a spike (e.g., transient or rapid increase in motor current) or in general an elevated motor current motor (to substantially neutrally rotate and/or be driven to rotate at the same speed as a an unwinding cord, string, or other tangled medium), while continuing to maneuver the robot across the floor performing uninterrupted coverage or cleaning of the floor or other motion behaviors. In one implementation, the brush control process on the controller, following an elevated edge cleaning head motor current, reverse biases the edge cleaning head motor (to substantially neutrally rotate and/or be driven to rotate at the same speed as a an unwinding cord, string, or other tangled medium) and subsequently or concurrently passes a signal to a drive motor control process, directly or indirectly via a supervising process, so that the unwinding may occur at the same time that the robot drives substantially backwards, alters a drive direction, and moves the robot forward.

In one implementation, the edge cleaning head includes a brush with bristles that extend beyond a peripheral edge of the chassis. In one example, the edge cleaning head includes at least one brush element having first and second ends, the bush element defining an axis of rotation about the first end normal to the work surface. The edge cleaning head may rotate about a substantially vertical axis. In one instance, the edge cleaning head includes three brush elements, where each brush element forms an angle with an adjacent brush element of about 120 degrees. In another instance, the edge cleaning head comprises six brush elements, where each brush element forms an angle with an adjacent brush element of about 60 degrees.

In another implementation, the edge cleaning head comprises a rotatable squeegee that extends beyond a peripheral edge of the chassis. The rotatable squeegee may be used for wet cleaning, surface treatments, etc.

In yet another implementation, the edge cleaning head includes a plurality of absorbent fibers that extend beyond a peripheral edge of the chassis upon rotation of the cleaning head. The plurality of absorbent fibers may be used like a mop to clean up spills, clean floors, apply surface treatments, etc.

The robot may include multiple cleaning heads (e.g., two or three) carried by the chassis. In one example, the robot further includes a main cleaning head carried by the chassis, a cleaning head extending across a swath covered by the robot, which forms the main work width of the robot, and which may be driven to rotate about a horizontal axis to engage a floor surface while the robot is maneuvered across the floor. The main cleaning head may include a cylindrical body defining a longitudinal axis of rotation parallel to the work surface, bristles disposed on the cylindrical body, and flexible flaps disposed longitudinally along the cylindrical body. The brush control process on the controller is configured to reverse bias the rotation of the main cleaning head (to substantially neutrally rotate and/or be driven to rotate at the same speed as a an unwinding cord, string, or other tangled medium), in response to an elevated main cleaning head motor current, while a motion control process independently continues to maneuver the robot across the floor. In another example, the robot includes two main cleaning brushes carried by the chassis and driven to rotate about a horizontal axis to engage a floor surface while the robot is maneuvered across the floor. The two main cleaning brushes may be driven to rotate in the same or opposite directions.

In another aspect, a method of disentangling an autonomous coverage robot includes placing the robot on a floor surface, the robot autonomously traversing across the floor surface in a forward direction of the robot while rotating about a non-horizontal axis an edge cleaning head carried by the chassis and driven by an edge cleaning head motor. The edge cleaning head extends beyond a lateral extent of the chassis while engaging the floor surface. The robot independently provides a reverse bias for the edge cleaning head motor (to substantially neutrally rotate and/or be driven to rotate at the same speed as a an unwinding cord, string, or other tangled medium), in response to an elevated edge cleaning head motor current while continuing to maneuver across the floor surface.

In one implementation, the brush control process on the controller of the robot determines movement of the robot in the forward direction before (independently of robot motion control) reversing the rotation of the edge cleaning head in response to an elevated cleaning head motor current. The brush control process of the robot may (independently of robot motion control) reverses the rotation of the edge cleaning head in response to an elevated edge cleaning head motor current for a period of time. In one example, after the brush control process reverses the rotation of the edge cleaning head, the brush control process may directly or through a supervising process pass a signal to the motion control process of the robot to move in a reverse direction, alter a drive direction, and moves in the drive direction.

In another implementation, the robot also includes a main cleaning brush carried by the chassis, which may be driven to rotate about a horizontal axis to engage the floor surface while the robot is maneuvered across the floor. The robot independently reverses the rotation of the main cleaning brush in response to an elevated main cleaning head motor current while continuing to maneuver across the floor surface. The brush cleaning process of the robot may also determine movement of the robot in the forward direction before independently reversing the rotation of the main cleaning brush in response to an elevated main cleaning brush motor current. Furthermore, the brush cleaning process of the robot may also reverse the rotation of the main cleaning brush for a certain period of time or in intervals.

In another aspect, an autonomous coverage robot includes a drive system, a bump sensor, and a proximity sensor. The drive system is configured to maneuver the robot according to a heading (turn) setting and a speed setting. The bump sensor is responsive to a collision of the robot with an obstacle in a forward direction. The proximity sensor is responsive to an obstacle forward of the robot at a proximate distance but not contacting the robot, e.g., 1-10 inches, preferably 1-4 inches. The motion control processes of the drive system may also be configured to reduce the speed setting in response to a signal from the proximity sensor indicating detection of a potential obstacle, while continuing a cleaning or coverage process, including advancing the robot according to the heading setting. Furthermore, the motion control processes of the drive system may also be configured to alter the heading (turn) setting in response to a signal received from the bump sensor indicating contact with an obstacle.

In some instances, the motion control processes of the drive system may be configured to alter the heading setting in response to the signals received from the bump sensor and one or more side proximity sensors to follow a perimeter of the obstacle. In other instances, the drive system may be configured to alter the heading (turn) setting in response to the signals received from the bump sensor and the proximity sensor to direct the robot away from the obstacle. In one example, the drive system is configured to maneuver the robot at a torque (e.g., motor current or motor resistance) setting and the drive system is configured to alter the motor current or motor resistance setting in response to a signal received from the bump sensor indicating contact with an obstacle. The drive system may increase the motor current or motor resistance setting in response to a signal received from the bump sensor indicating contact with an obstacle.

The proximity sensor may include a plurality of sets of at least one infrared emitter and receive pair, directed toward one another to converge at a fixed distance from one another, substantially as disclosed in "Robot obstacle detection system", U.S. Pat. No. 6,594,844, herein incorporated by reference in its entirety. Alternatively, the proximity sensor may include a sonar device. The bump sensor may include a switch, a capacitive sensor, or other contact sensitive device.

The robot may be placed on the floor. In yet another aspect, a method of navigating an autonomous coverage robot with respect to an object on a floor includes the robot autonomously traversing the floor in a cleaning mode at a full cleaning speed. Upon sensing a proximity of the object forward of the robot, the robot reduces the cleaning speed to a reduced cleaning speed while continuing towards the object until the robot detects a contact with the object. Upon sensing contact with the object, the robot turns with respect to the object and cleans next to the object, optionally substantially at the reduced cleaning speed. The robot may follow a perimeter of the object while cleaning next to the object. Upon leaving the perimeter of the robot, the robot may increase speed to a full cleaning speed. The robot may maintain a substantially constant following distance from the object, may maintain a following distance smaller than the extent of extension of an edge cleaning head or brush beyond a following side of the robot body, or may substantially contact the object while cleaning next to the object in response to the initial, reduced cleaning speed contact with the object. In one example, the following distance from the object is substantially a distance between the robot and the object substantially immediately after the contact with the object. In another example, the following distance from the object is between about 0 and 2 inches.

In one instance, the robot performs a maneuver to move around the object in response to the contact with the object. The maneuver may include the robot moving in a substantially semi-circular path, or a succession of alternating partial spirals (e.g., arcs with progressively decreasing radius) around the object. Alternatively, the maneuver may include the robot moving away from the object and then moving in a direction substantially tangential to the object.

Upon sensing a proximity of the object forward of the robot, the robot may decrease the full cleaning speed to a reduced cleaning speed at a constant rate, an exponential rate, a non-linear rate, or some other rate. In addition, upon sensing contact with the object, the robot may increase a torque (e.g., motor current) setting of the drive, main brush, or side brush motors.

In yet another aspect, an autonomous robot includes a chassis, a drive system mounted on the chassis and configured to maneuver the robot, and a floor proximity sensor carried by the chassis and configured to detect a floor surface below the robot. The floor proximity sensor includes a beam emitter configured to direct a beam toward the floor surface and a beam receiver responsive to a reflection of the directed beam from the floor surface and mounted in a downwardly-directed receptacle of the chassis. The floor proximity sensor may be a substantially sealed unit (e.g., in the downward direction) and may also include a beam-transparent cover having a forward and rearward edge disposed across a lower end of the receptacle to prohibit accumulation of sediment, "carpet fuzz", hair, or household dust within the receptacle. The cover may include a lens made of an anti-static material. The forward edge of the cover, i.e., the edge of the cover in the direction of robot motion, at the leading edge of the robot, is elevated above the rearward edge. The lower surface of the receptacle may be wedge shaped. In one example, the floor proximity sensor includes at least one infrared emitter and receiver pair, substantially as disclosed in "Robot obstacle detection system", U.S. Pat. No. 6,594,844.

In one implementation, the drive system of the robot includes at least one driven wheel suspended from the chassis and at least one wheel-floor proximity sensor carried by the chassis and housed adjacent one of the wheels, the wheel-floor proximity sensor configured to detect the floor surface adjacent the wheel. The drive system may also include a controller configured to maneuver the robot away from a perceived cliff in response a signal received from the floor proximity sensor. In some instances, the drive system includes a wheel drop sensor housed near one of the wheels and responsive to substantial downward displacement of the wheel with respect to the chassis. The drive system may include a validation system that validates the operability of the floor proximity sensors when all wheels drop. The validation is based on the inference that all wheels dropped are likely the result of a robot being lifted off the floor by a person, and checks to see that all floor proximity sensors do not register a floor surface (either no reflection measured, or a reflection that is too strong). Any sensor that registers a floor surface or a too strong reflection (e.g., indicating a blocked sensor) is considered blocked. In response to this detection, the robot may initiate a maintenance reporting session in which indicia or lights indicate that the floor proximity sensors are to be cleaned. In response to this detection, the robot will prohibit forward motion until a validation procedure determines that all floor proximity sensors are clear and are functional. Each wheel-floor and wheel drop proximity sensors may include at least one infrared emitter and receiver pair.

DESCRIPTION OF DRAWINGS

FIGS. 17 A-H illustrate examples of methods for disentangling coverage robots with various configurations of cleaning heads.

FIG. 17A illustrates a method of disentangling which may be used with a coverage robot having an agitating roller FIG. 17B illustrates a method of disentangling which may be used with a coverage robot having an agitating roller and a brush roller.

FIG. 17C has a side view and a bottom view that illustrates a method for disentangling a coverage robot with dual agitating rollers.

FIG. 17D illustrates an alternate method of disentangling with the robot shown in FIG. 17C.

FIG. 17E illustrates a method of disentangling a coverage robot with two agitation rollers and a brush roller.

FIG. 17F illustrates another method of disentangling the coverage robot.

FIG. 17G has a side view and a bottom view illustrating a disentanglement method with a coverage robot 300 with two agitation rollers and two air ducts.

FIG. 17H has a side view and a bottom view illustrating a disentanglement method with a coverage robot 300 with two agitation rollers, a brush roller and two air ducts.

Like reference symbols in the various drawings indicate like elements.

DETAILED DESCRIPTION

Figure 1:
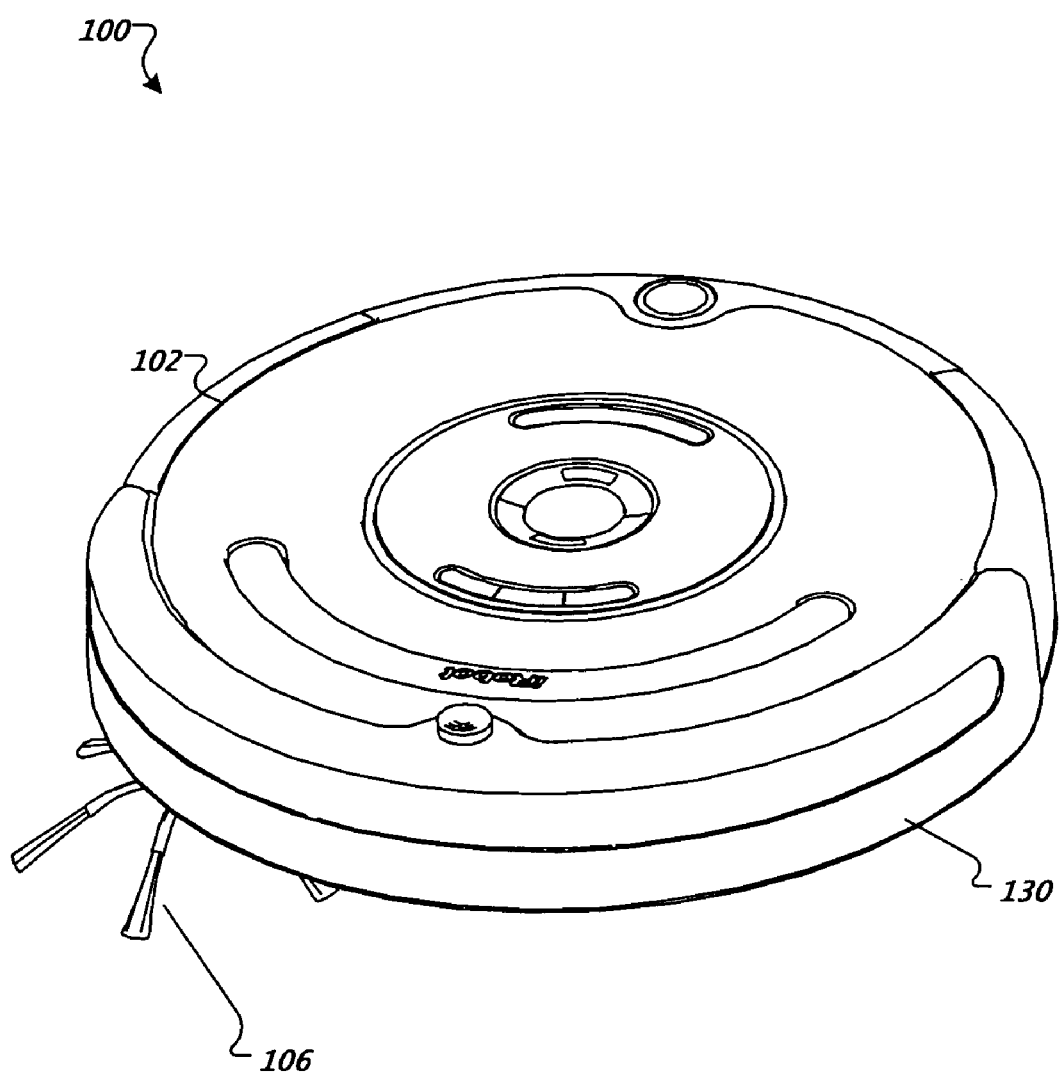
FIG. 1 shows an above-perspective view of an example autonomous coverage robot.
Figure 2:
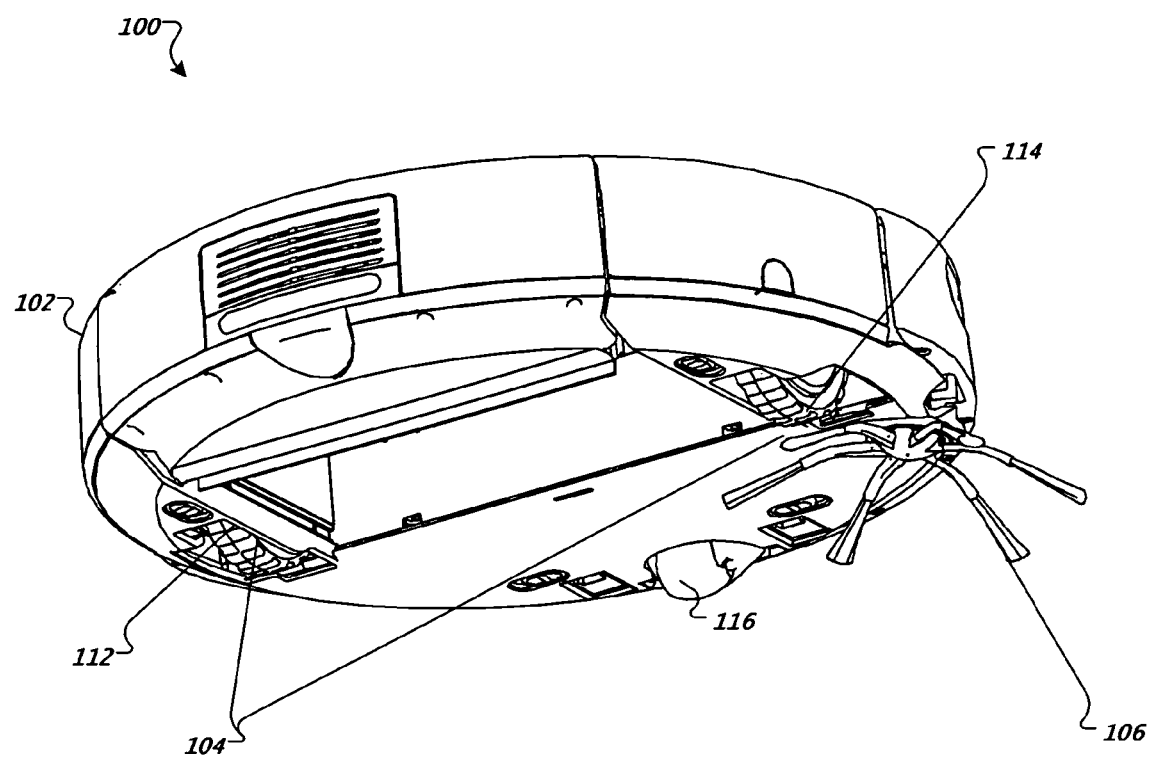
FIG. 2 shows a below-perspective view of an example autonomous coverage robot.
Figure 3:
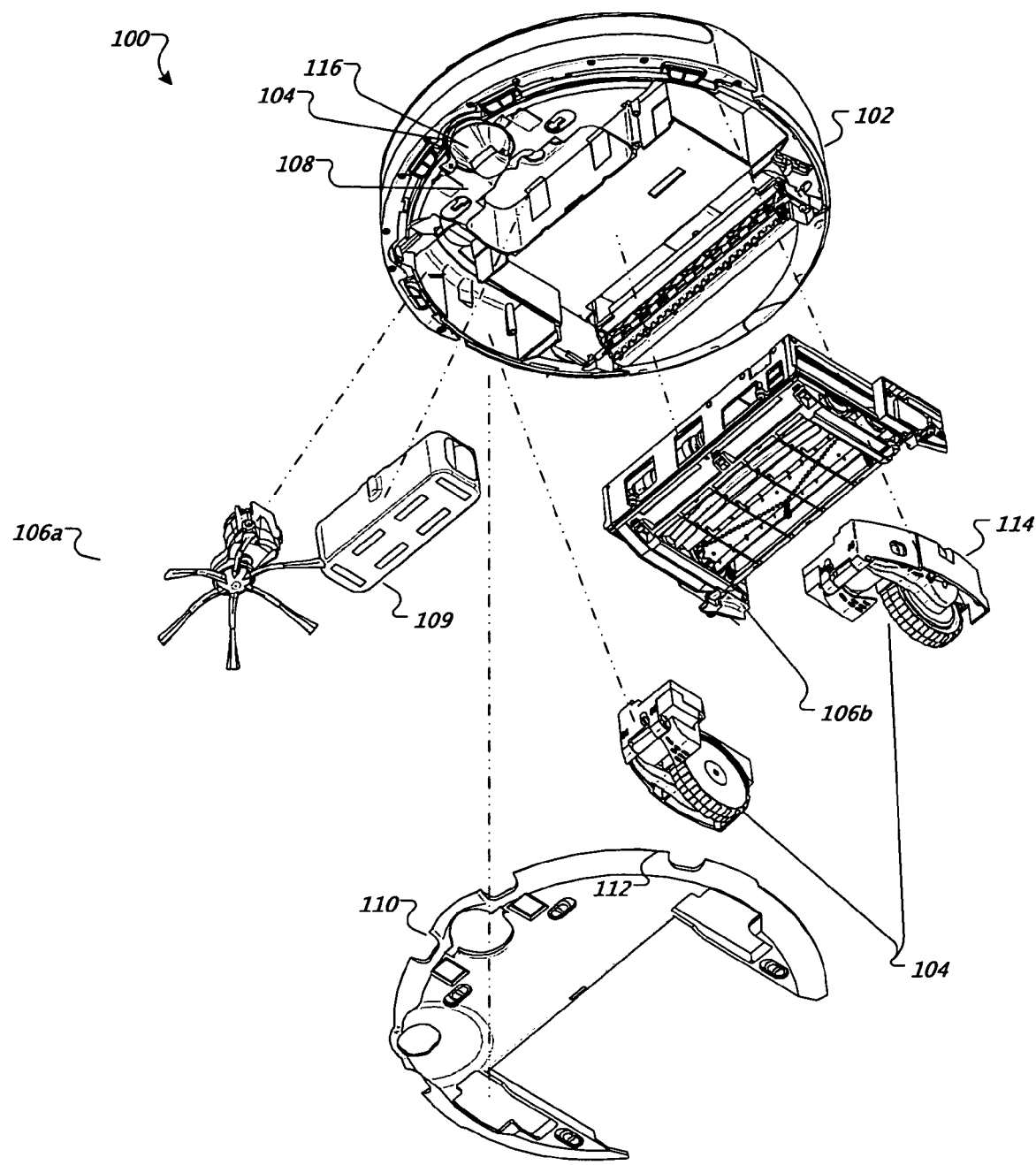
FIG. 3 shows an exploded view of an example autonomous coverage robot.

FIGS. 1-3 show above-perspective, below-perspective, and exploded views of an example autonomous coverage robot 100. Robot 100 has a chassis 102, a drive system 104, an edge cleaning head 106a, and a controller 108. Drive system 104 is mounted on the chassis 102, and is a differential drive (left and right wheels near to or on the center diameter of the robot and independently speed controllable) configured to maneuver robot 100. Edge cleaning head 106a is mounted to extend past the side edge of chassis 102 for removing dirt and debris below and immediately adjacent to robot 100, and more particularly to sweep dirt and debris into the cleaning path of the main cleaning head 106b as the robot cleans in a forward direction. In some implementations, the main or edge cleaning heads 106b, 106a may also be used to apply surface treatments. A controller 108 (also depicted in FIG. 9A) is carried by chassis 102 and is controlled by behavior based robotics to provide commands to the components of robot 100 based on sensor readings or directives, as described below, to clean or treat floors in an autonomous fashion. A battery 109 may provide a source of power for robot 100 and its subsystems. A bottom cover 110 may protect internal portions of robot 100 and keep out dust and debris.

Drive system 104 includes a left drive wheel assembly 112, a right drive wheel assembly 114 and a castor wheel assembly 116. Drive wheel assemblies 112, 114 and castor wheel assembly 116 are connected to chassis 102 and provide support to robot 106. Controller 108 may provide commands to the drive system to drive wheels 112 and 114 forward or backwards to maneuver robot 100. For instance, a command may be issued by controller 108 to engage both wheel assemblies in a forward direction, resulting in forward motion of robot 100. In another instance, a command may be issued for a left turn that causes left wheel assembly 112 to be engaged in the forward direction while right wheel assembly 114 is driven in the rear direction, resulting in robot 100 making a clockwise turn when viewed from above.

Figure 4:
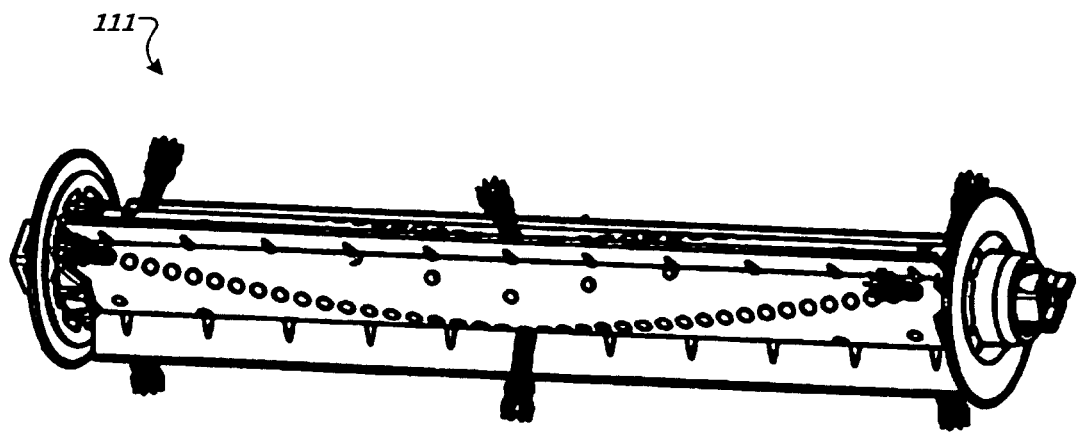
FIG. 4 shows a front-perspective view of an example main cleaning head which may be incorporated in an autonomous coverage robot.
Figure 5:
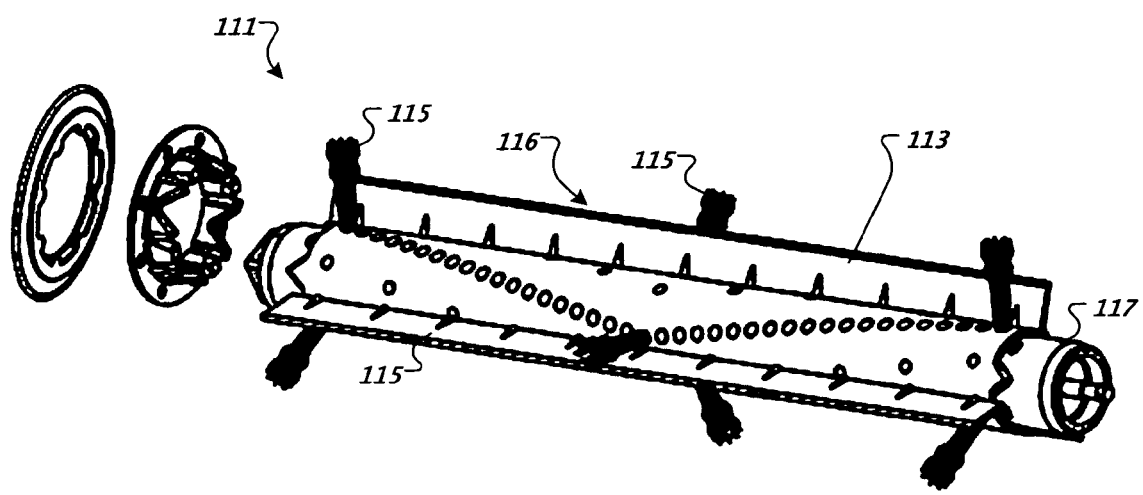
FIG. 5 shows an exploded view of an example main cleaning head which may be used with an autonomous coverage robot.

FIGS. 4 and 5 show front perspective and exploded views of a main cleaning brush 111 which may be incorporated in the main cleaning head 106b of the robot 100 via attachment to chassis 102. General structure of a robot and cleaning heads as disclosed herein is similar to that disclosed in U.S. Pat. No. 6,883,201, herein incorporated by reference in its entirety, except when so noted. In general, when a robot brush becomes entangled with cords, strings, hair, fringes or tassels, the brush motor may encounter overcurrent or temperature rise, and may cause increased energy consumption, poor cleaning, slowing or jamming of the brush. If the robot is so controlled or the entangling item is heavy or secured, the robot may be held in place, and if sensors are available to detect stasis, may stop moving and thereby fail to clean. A robot that gets stuck during its working routine must be "rescued" and cleaned in order to continue autonomous function. Theoretically, there may be additional expenditure of energy to combat static or dynamic friction in the drive wheels, caster, bin squeegee and cleaning head drive train (reverse-drive). The fringes/tassels/cords may wind tightly around a smallest wind diameter of the cleaning brush (e.g., usually the core of a brush 111, if the brush 111 includes only bristles). If the smallest diameter of the cleaning brush 111 is solid (no elasticity), additional energy may be required to overcome static or dynamic friction in a gear train of the cleaning head and the brushes in contact with the floor, e.g., when the brush is rotated in the opposite within the cleaning head in order to unwind the fringes/tassels/cords. If the tassel or string is permitted to continue winding about the brush, it may be necessary to remove the brush 111 from the cleaning head 106*b* in order to remove the entanglement. Main cleaning head 111 has baffles or soft flaps 113 and bristles 115 arranged along a cleaning head body 117. Soft flaps 113 disposed along the length of cleaning head body 117 may minimize static friction. Cleaning head body 117 may be rotated about its horizontal axis so that it engages the floor surface while robot 100 is moving across a floor, causing baffles 113 and bristles 115 to agitate dirt and debris which may be on the floor's surface. Controller 108 may be configured to reverse bias the rotation of main cleaning head 111 (i.e., provide sufficient reverse current to permit the cleaning brush to freely rotate when the robot draws out and unwinds an entanglement as it moves away in a forward direction) following a sharp rise in or an elevated main cleaning head motor current, while continuing to conduct a cleaning cycle or other cycle as the controller 108 executes individual motion control behaviors to move the robot 100 across the floor. A rim 116 of soft flaps 113 in this case can become the smallest diameter of cleaning head 111. Rim 116 is flexible (pliable, soft), so as to require little energy to deform, potentially diverting energy away from that required to initiate robot 100 movement. A momentary delay in a brush gear train encountering static friction provides an opportunity for robot 100 to resume movement, thereby enabling easier disentanglement of brushes. Similarly, a cord or tassel may become less entangled about the larger diameter of the rim 116 (in comparison to a core such as core 117 or even smaller core) simply because the brush 111 does not complete as many turns per unit length of entangled cord or tassel. Furthermore, a length-wise scooped (curved) nature of the flaps 13 further acts as a spring forcing the tassels/fringes to unravel/open during the momentary lag between the robot being set in motion and a reverse bias to bias back-driving of the entangled cleaning head 111. Bristles 115 may be used primarily used to clean, while flaps 113 may be used primarily for disentanglement purposes. This allows robot 100 to continue to clean (agitate the carpet) if an entangled string snaps off and gets retained by flaps 113 in cleaning head 111. Other robot details and features combinable with those described herein may be found in the following U.S. Provisional Patent Application No. 60/747,791, the entire contents of which are hereby incorporated by reference.

Figure 6A:
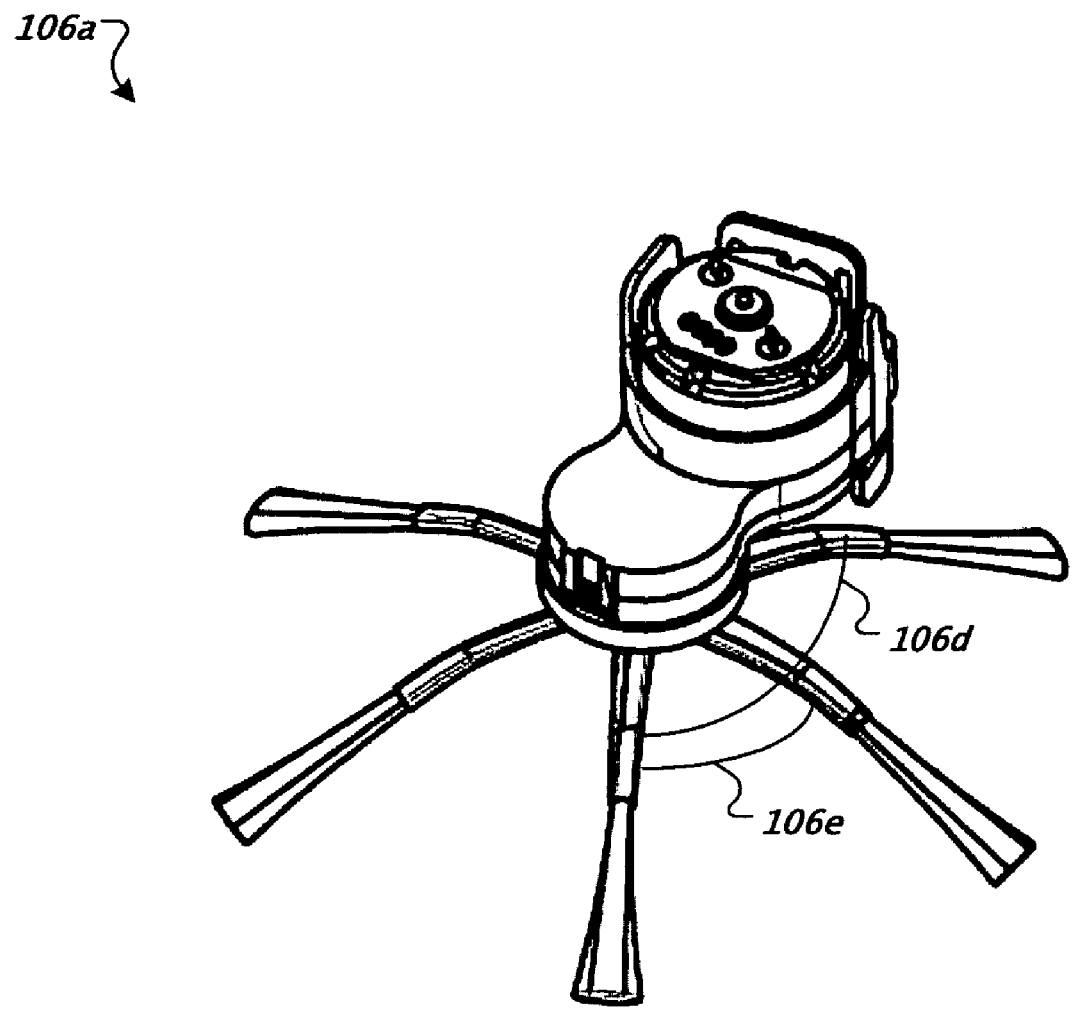
FIG. 6A shows an above-perspective view of an example edge cleaning head which uses a rotatable brush.
Figure 6B:
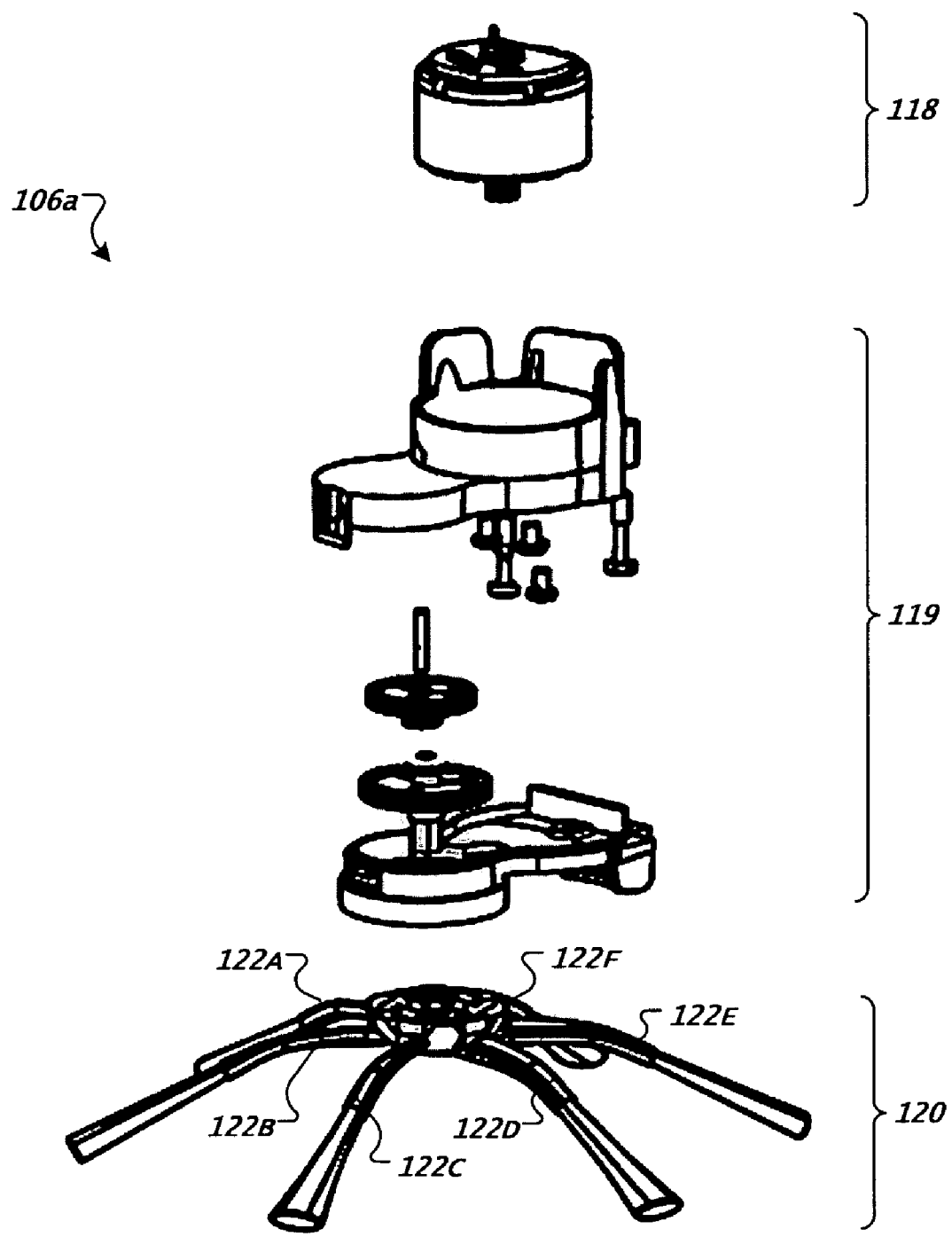
FIG. 6B shows an exploded view of an example edge cleaning head.
Figure 6C:
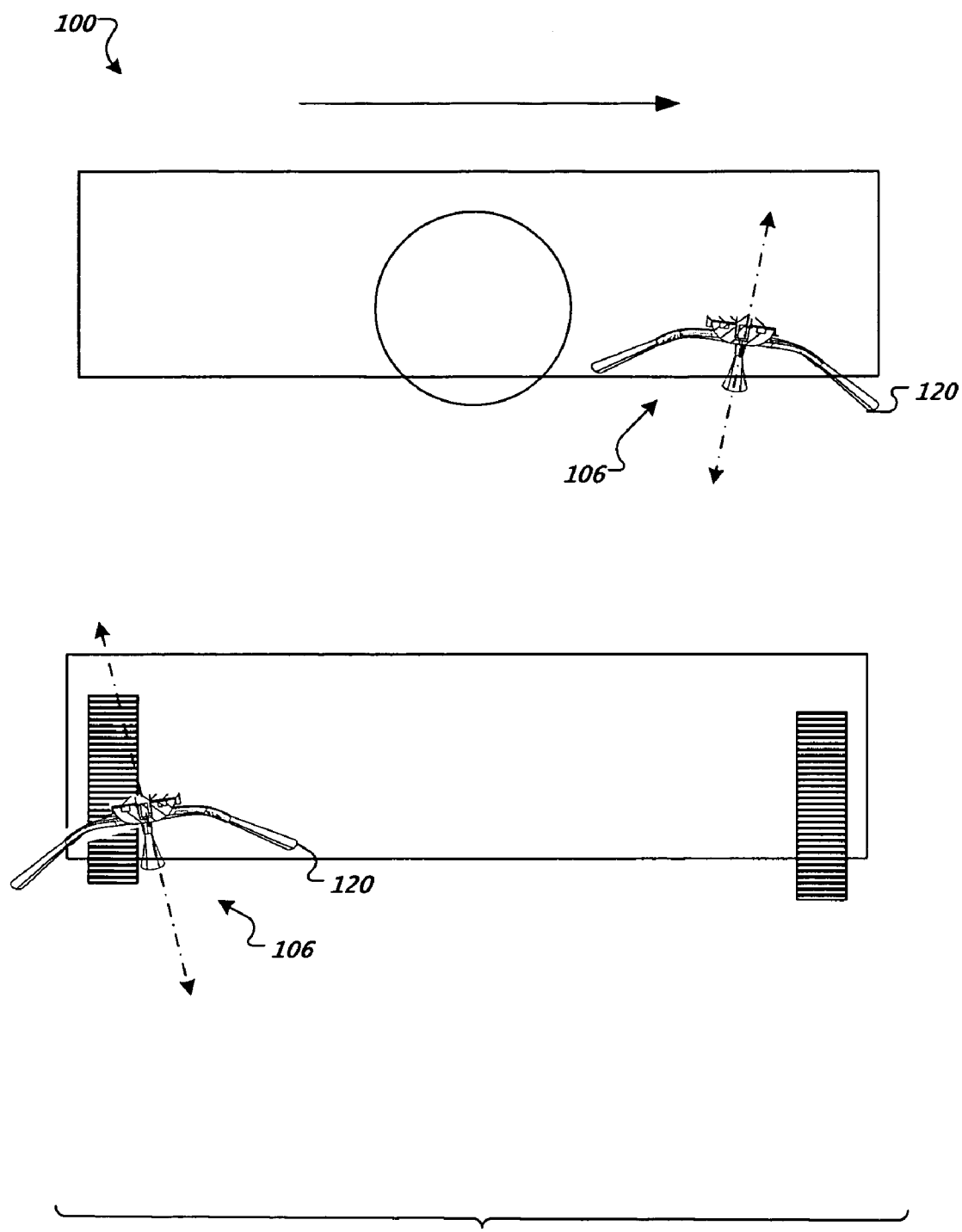
FIG. 6C shows schematic views of a tilt of an example edge cleaning head.

FIGS. 6A and 6B show above-perspective and exploded views of edge cleaning head 106. Edge cleaning head 106*a* is carried by chassis 102 and driven by an edge cleaning head motor 118 and drive transmission 119 to rotate a brush 120 about a non-horizontal axis. Brush 120 has brush elements 122A-F that extend beyond a peripheral edge of chassis 102. Each brush element 122A-F forms an angle of about 60 degrees with adjacent brush elements and is tipped with bristles extending along the axis of the elements. Brush 120 may be rotated about a vertical axis, such that the ends of bush elements 122A-F move normal to the work surface. Edge cleaning head 106 may be located near the edge of robot 100 so that brush 120 is capable of sweeping dirt and debris beyond the edge of chassis 102. In some implementations, the edge cleaning head 106 operates about an axis offset (tilted) from a vertical axis of the robot. As shown in schematic form in FIG. 6C the brush 106 may be tilted, in both forward and side to side directions (i.e., tilted downward with respect to the plane of wheel contact about a line about 45 degrees from the direction of travel within that plane), in order to collect debris from outside the robot's periphery toward the main work width, but not disturb such collected debris once it is there or otherwise eject debris from the work width of the robot. The axis offset is optionally adjustable to customize the tilt of the cleaning head 106 to suit various carpet types, such as shag.

Figure 7:
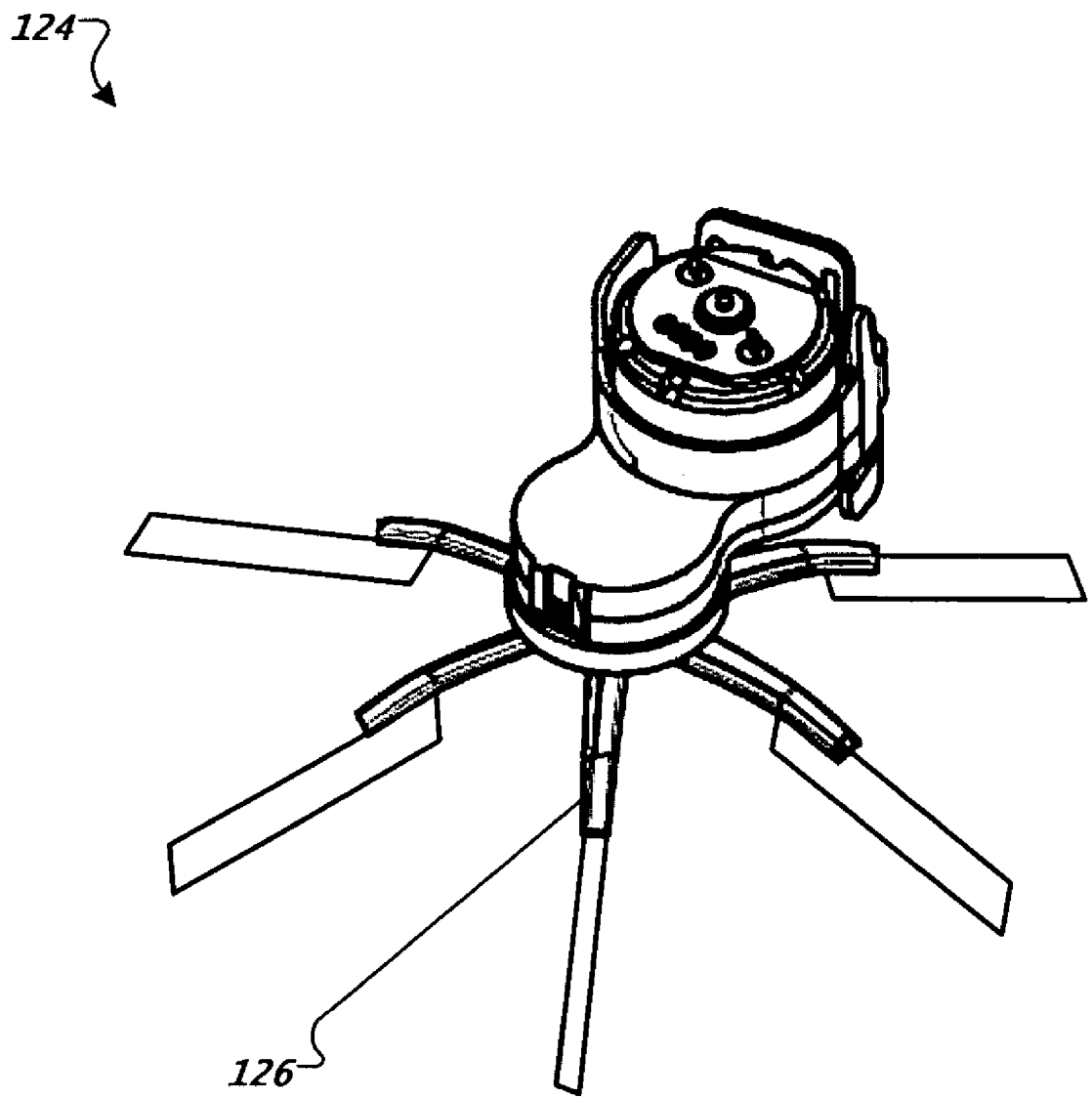
FIG. 7 shows an example of an edge cleaning head with a rotatable squeegee.

Other configurations of edge cleaning heads may also be used with robot 100. For example, an edge cleaning head may have three evenly-spaced brush elements separated by 120 degrees. FIG. 7 shows another example of an edge cleaning head 124 in which a rotatable squeegee 126 is used in place of a brush. In other configurations, an edge cleaning head may have one or more absorbent fibers that extend beyond a peripheral edge of chassis 102.

Figure 8A:
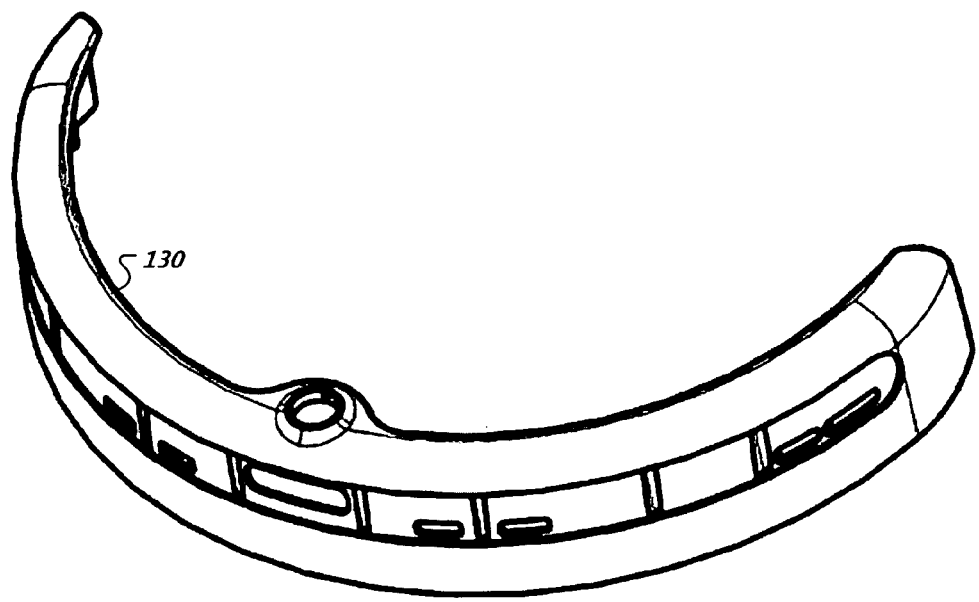
FIG. 8A shows a bumper which may be used with autonomous coverage robot.
Figure 8B:
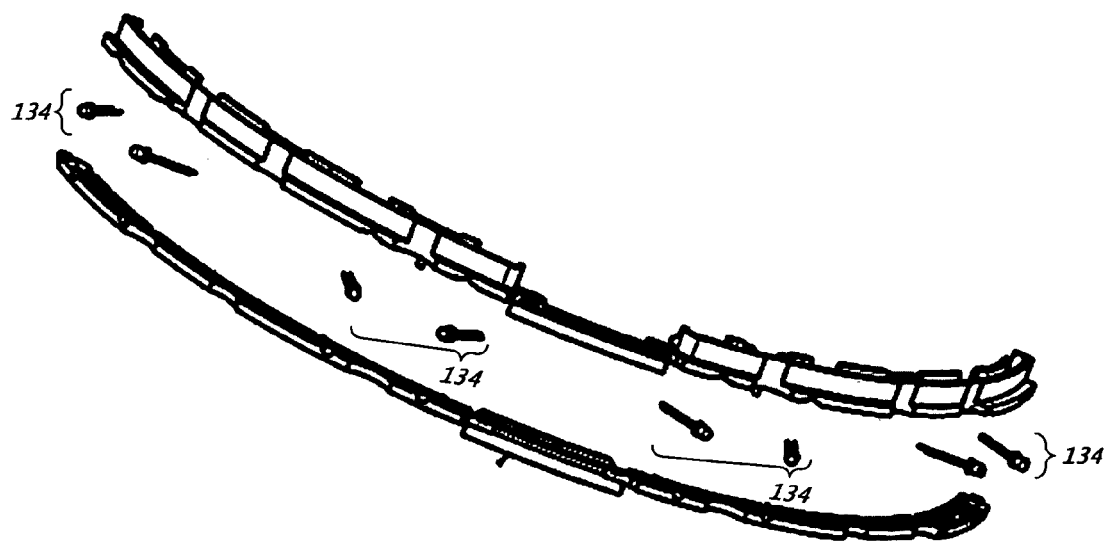
FIG. 8B shows kinetic bump sensors and proximity sensors.

FIG. 8A shows a bumper 130 which may be used with the autonomous coverage robot 100. FIG. 8B shows proximity sensors 134 which may be housed within bumper 130. Drive system 104 may be configured to maneuver robot 100 according to a heading setting and a speed setting. Proximity sensors 134 may sense a potential obstacle in front of the robot.

Figure 9A:
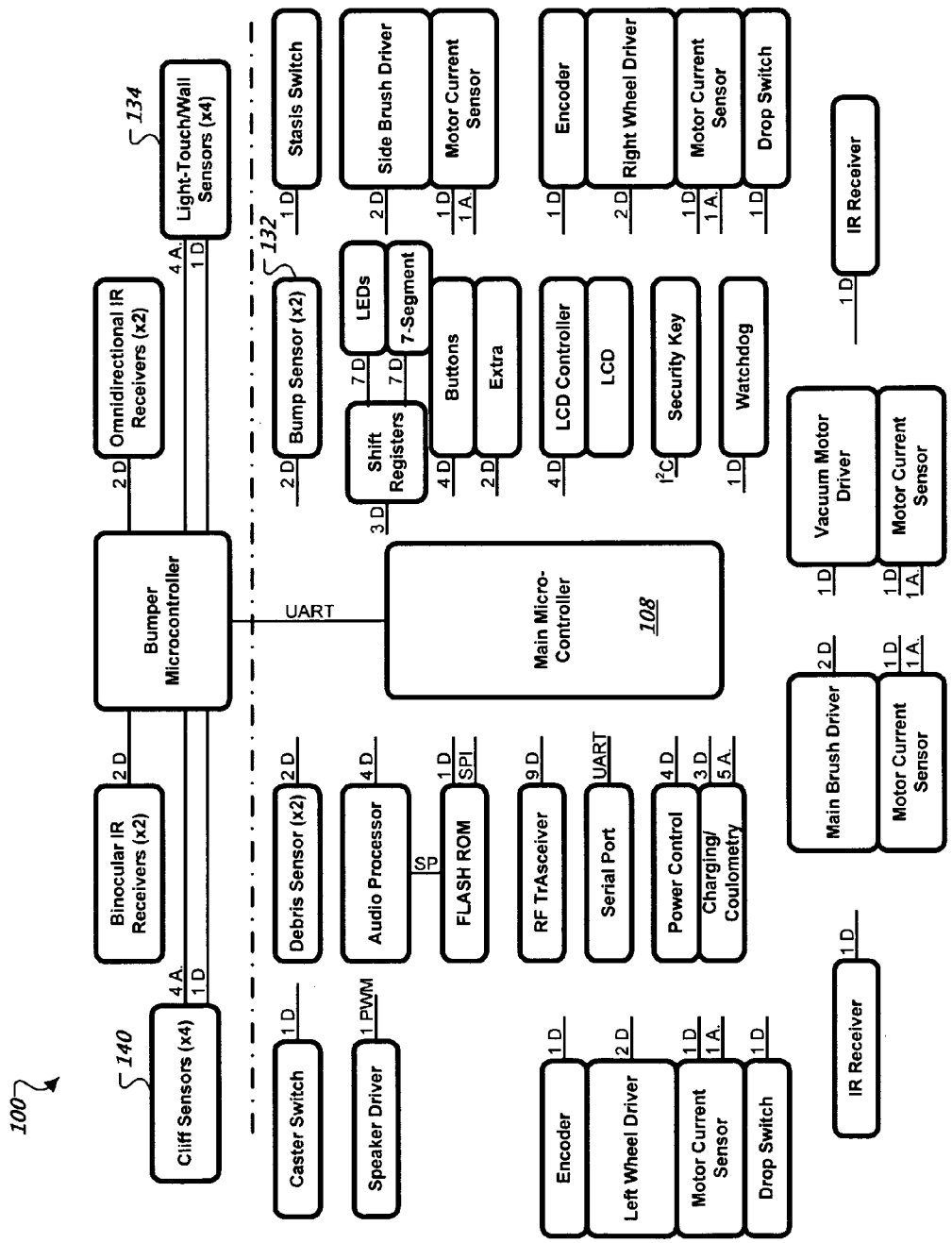
FIG. 9A shows a block diagram of an exemplary robot.

FIG. 9A shows a schematic view of electronics of the robot 100. The robot 100 includes a controller 103 which communicates with a bumper micro-controller 107A, that together control an omni-directional receiver, directional receiver, the wall proximity sensors 134, and the bumper switches 132. The controller 103 monitors all other sensor inputs, including the cliff sensors 140 and motor current sensors for each of the motors.

Control of the direction and speed of the robot 100 may be handled by motion control behaviors selected by an arbiter according to the principles of behavior based robotics for coverage and confinement, generally disclosed in U.S. Pat. Nos. 6,809,490 and 6,781,338, herein incorporated by reference in their entireties (and executed by controller 108), to reduce the speed magnitude of robot 100 when proximity sensor 134 detects a potential obstacle. The motion behaviors executed by the controller 108 may also alter the velocity of robot 100 when kinetic bump sensors 132 detect a collision of robot 100 with an obstacle. Accordingly, referring to FIG. 9A, robot 100 traverses a floor surface by executing a cruising or STRAIGHT behavior 900. When robot 100 detects a proximate, but not yet contacting obstacle via proximity sensors 134, robot 100 executes a gentle touch routine 902 (which may be a behavior, a part of a behavior, or formed by more than one behavior), in which robot 100 does not proceed at full cleaning speed into the obstacle; but instead reduces its approach speed from a full cleaning speed of about 300 mm/sec to a reduced cleaning speed of about 100 mm/sec via controller 108 toward the potential obstacle, such that when a collision does occur, the collision is less noisy, and less likely to mar surfaces. The overall noise, the potential damage to the robot 100 or the object being collided thereby is reduced. When robot 100 detects contact with the object via kinetic bump sensors 132, robot 100 executes one of the following routines: bounce 910, follow obstacle perimeter 912, alter drive direction and move away from object 914, or alter drive direction to curve to approach the object and follow along it (e.g., a wall). Bounce 910 entails robot 100 moving so as to bounce along the object. Follow obstacle perimeter 912 entails robot 100 using proximity sensors 134 to follow along a perimeter of the object at a predefined distance to, for example, clean up close to the object and/or clean to the very edge of a wall. The robot 100 continuously cleans the room, and when it detects a proximate object (which may be a wall, table, chair, sofa, or other obstacle) in the forward direction, it continues cleaning in the same direction without interruption, albeit at a reduced speed. In predetermined and/or random instances, the robot 100 will bump the object, turn in place so that the edge of the main cleaning head 106*b* is as close to the wall as possible, and closely follow the object on the side of the robot, essentially at the reduced cleaning speed, such that the side/edge brush 106*a* collects debris or dirt from the corner between the floor and the wall or obstacle. Once the robot 100 leaves the wall, after a predetermined and/or randomized distance within predetermined limits, the robot 100 increases its speed up to full cleaning speed. On other occasions, it will bump the object, turn in place until facing away from the object or wall, and immediately proceed away from the object or wall at full cleaning speed.

The robot 100 employs a behavioral software architecture within the controller 103. While embodiments of the robot 100 discussed herein may use behavioral based control only in part or not at all, behavior based control is effective at controlling the robot to be robust (i.e. not getting stuck or failing) as well as safe. The robot 100 employs a control and software architecture that has a number of behaviors that are executed by an arbiter in controller 103. A behavior is entered into the arbiter in response to a sensor event. In one embodiment, all behaviors have a fixed relative priority with respect to one another. The arbiter (in this case) recognizes enabling conditions, which behaviors have a full set of enabling conditions, and selects the behavior having the highest priority among those that have fulfilled enabling conditions. In order of decreasing priority, the behaviors are generally categorized as escape and/or avoidance behaviors (such as avoiding a cliff or escaping a corner), and working behaviors (e.g., wall following, bouncing, or driving in a straight line). The behaviors may include: different escape (including escaping corners, anti-canyoning, stuck situations, "ballistic" temporary fire-and-forget movement that suppress some avoid behaviors, e.g., as disclosed in U.S. Pat. No. 6,809,490) cliff avoiding, virtual wall avoiding (a virtual wall may be a beacon with a gateway beam), spot coverage (covering in a confined pattern such as a spiral or boustrophedon patch), align (turning in place, using side proximity sensors to align with a forward obstacle encountered while obstacle following, e.g., an inside corner), following (representing either or both of substantially parallel or bump following along an obstacle using a side proximity sensor or bumper that extends to the side of the robot), responding to a bump in order to "bounce" (a behavior that occurs after the robot bumps an object), and drive (cruising). Movement of the robot, if any, occurs while a behavior is arbitrated. If more than one behavior is in the arbiter, the behavior with a higher priority is executed, as long as any corresponding required conditions are met. For example, the cliff avoiding behavior will not be executed unless a cliff has been detected by a cliff detection sensor, but execution of the cliff avoiding behavior always takes precedence over the execution of other behaviors that also have satisfied enabling conditions.

The reactive behaviors have, as their enabling conditions or triggers, various sensors and detections of phenomena. These include sensors for obstacle avoidance and detection, such as forward proximity detection (multiple), forward bump detection (multiple), cliff sensors (multiple), detection of a virtual wall signal (which may instead be considered a coverage trigger). Sensors of these types are be monitored and conditioned by filters, conditioning, and their drivers, which can generate the enabling conditions as well as record data that helps the behavior act predictably and on all available information (e.g., conversion to one-bit "true/false" signals, recording of likely angle of impact or incidence based on strength or time differences from a group of sensors, or historical, averaging, frequency, or variance information).

Actual physical sensors may be represented in the architecture by "virtual" sensors synthesized from the conditioning and drivers. Additional "virtual" sensors that are synthesized from detectable or interpreted physical properties, proprioceptive or interpreted upon the robot 100, such as over-current of a motor, stasis or stuck condition of the robot 100 (by monitoring a lack of odometry reading from a wheel encoder or counter), battery charge state via coulometry, and other virtual sensors.

In addition, reactive behaviors can act according to enabling conditions that represent detected phenomena to be sought or followed. A beam or wireless (RF, acoustic) signal can be detected without direction; or in some cases with direction. A remote beam or marker (bar code, retro-reflective, distinctive, fiducial, or natural recognized by vision landmark) giving a direction can permit homing or relative movement; without direction the robot 100 can nonetheless move to servo on the presence, absence, and/or relative strength of a detected signal. The reflection of a beam from the robot 100, edge, or line can be similarly detected, and following behaviors (such as obstacle following by the robot 100) conducted by servoing on such signal. A debris or artifact signal can be collected by monitoring debris or objects collected by or traversed by the robot, and that signal can be an enabling condition for a reactive behavior controlling a spot coverage pattern.

The robot 100 maintains concurrent processes, "parallel" processes that are not generally considered reactive behaviors. A scheduler may be necessary to allocate processor time to most other processes, e.g., including the arbiter and behaviors, in a co-operative or other multitasking manner. If more threading is available, less processes may be managed by the scheduler. As noted, filters and conditioning and drivers, can interpret and translate raw signals. These processes are not considered reactive behaviors, and exercise no direct control over the motor drives or other actuators. In addition, in the present embodiment, brush motor controller(s) control the main and side brushes, although these may alternatively be controlled by dedicated brush behaviors and a brush control arbiter.

In accordance with another example, the gentle touch routine 902 may employ an infrared proximity detector 134 that should go off (i.e., when a receiver receives from a reflection originating in the overlapping space of an emitter and receiver angled toward one another) from about 1 to 10 inches (preferably, from 1 to 4 inches. This distance is selected in order to be within the effective range of the IR proximity or cross-beam sensor 134, yet with sufficient time to slow the mobile robot 100 before a collision with a detected obstacle). Conventional proximity sensors return a signal strength depending on obstacle albedo; cross-beam sensors 134 can be thresholded for various albedos intruding in the specific distance from the sensor where the receiver and emitter's beam/field cross. Additionally, slowing down based on a proximately detected wall may be suppressed in or turned off by the user, independently of the bump sensor 132. Controller 108 may slow the robot's descent substantially in a steady reduction then cruise slowly. Controller 108 may execute an S-curve slowly over about 3 inches, can slow down steadily but at an accelerating or decelerating rate over about 3 inches. During escape behaviors, for example, panic, stasis, stuck, anti-canyoning, the robot may essentially can be turn off the proximity sensors 134—usually by not using the proximity sensors 134 as an enabling condition for any escape behavior or some avoidance behaviors Drive system 104 may be configured to reduce the speed setting in response to a signal from proximity sensor 134 which indicating detection of a forward obstacle, while continuing to advance the robot 100 and work the floor or surface according to the existing heading setting. Drive system 104 may be configured to alter the heading setting in response to a signal received from bump sensor 132 that indicates contact with an obstacle. For example, drive system 104 may be configured to alter the heading setting in response to the signals received from the bump sensor 132 and the proximity sensor 134 such that robot 100 follows a perimeter of the obstacle. In another example, drive system 104 may be configured to change heading to direct robot 104 away from the obstacle.

Proximity sensors 134 may include one or more pairs of infrared emitters and receivers. For instance, a modulated emitter and a standard receiver may be used. A light pipe (not shown), collimating or diffusing optics, Fresnel or diffractive optics, may be used in some implementations to eliminate blind spots by providing a more uniform light pattern or a light pattern more concentrated or more likely to be detected in high probability/high impact areas, such as the immediate forward direction. Alternatively, some implementations may make use of sonar or other types of proximity sensors.

In some implementations, kinetic bump sensor 132 may include a mechanical switch 130. In some implementations, bump sensor 132 may include a capacitive sensor. Other types of contact sensors may also be used as well.

Drive system 104 may be configured to maneuver robot 100 at a torque (or motor current) setting in response to a signal received from bump sensor 132 which indicates contact with an obstacle. For instance, drive system 104 may increase the torque (or motor current) setting in response to a signal received from the bump sensor indicating contact with an obstacle.

In another example method of navigating an autonomous coverage robot with respect to an object on a floor, robot 100 may be initially placed on the floor (or may already be on the floor, e.g., if the robot starts itself from a charging dock) with robot 100 autonomously traversing the floor in a cleaning mode at a full cleaning speed. If robot 100 senses a nearby object in front of robot 100, it reduces the cleaning speed (e.g., to a reduced cleaning speed) and continues moving toward the object and working/cleaning the floor until detecting impact, which is likely to be with the object but may be another object. Upon sensing impact with an object, robot 100 turns with respect to the object that it bumped and cleans next to, i.e., along, the object. Robot 100 may, for instance, follow the object's perimeter while cleaning along or next to the object. In another instance, robot 100 may maintain a somewhat constant following distance from the object while cleaning next to the object in response to the contact with the object. The following distance from the object may be a distance between robot 100 and the object immediately after the contact with the object, for instance, 0 to 2 inches. The distance is optionally less than the distance that the side or edge brush unit 106a extends beyond the side of the robot.

Robot 100 may, in some instances, perform a maneuver to move around the object in response to the contact with the object. For example, robot 100 may move in a somewhat semi-circular path around the object, or a succession of alternating partial spirals (e.g., arcs with progressively decreasing radius). In another instance, robot 100 may move away from the object and then move in a direction that is somewhat tangential to the object.

Robot 100 may decrease the cleaning speed to a reduced speed at a constant rate, for instance, at a non-linear or exponential rate. The full cleaning speed of robot 100 may be about 300 mm/s and the reduced cleaning speed of robot 100 may be about 100 mm/s.

Figure 10:
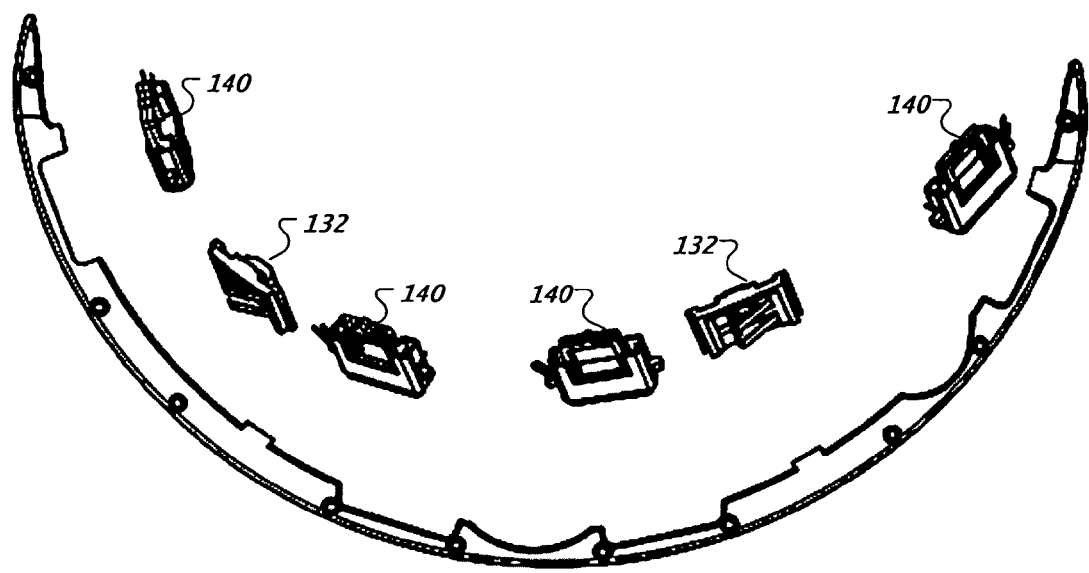
FIG. 10 shows floor proximity sensors and an attachment brace which may be used for detecting an adjacent floor.

FIG. 10 shows kinetic bump sensors 132, floor proximity sensors 140 and an attachment brace 142 which may be used with robot 100 for detecting an adjacent floor. Kinetic bump sensors 132 may sense collisions between robot 100 and objects in the robot's forward path. Floor proximity sensors may be carried by chassis 102 and be used to sense when robot 100 is near a "cliff", such as a set of stairs. Floor proximity sensors 140 may send signals to controller 108 indicating whether or not a cliff is detected. Based on signals from the floor proximity sensors 140, controller 108 may direct drive system 104 to change speed or velocity to avoid the cliff.

Figure 11:
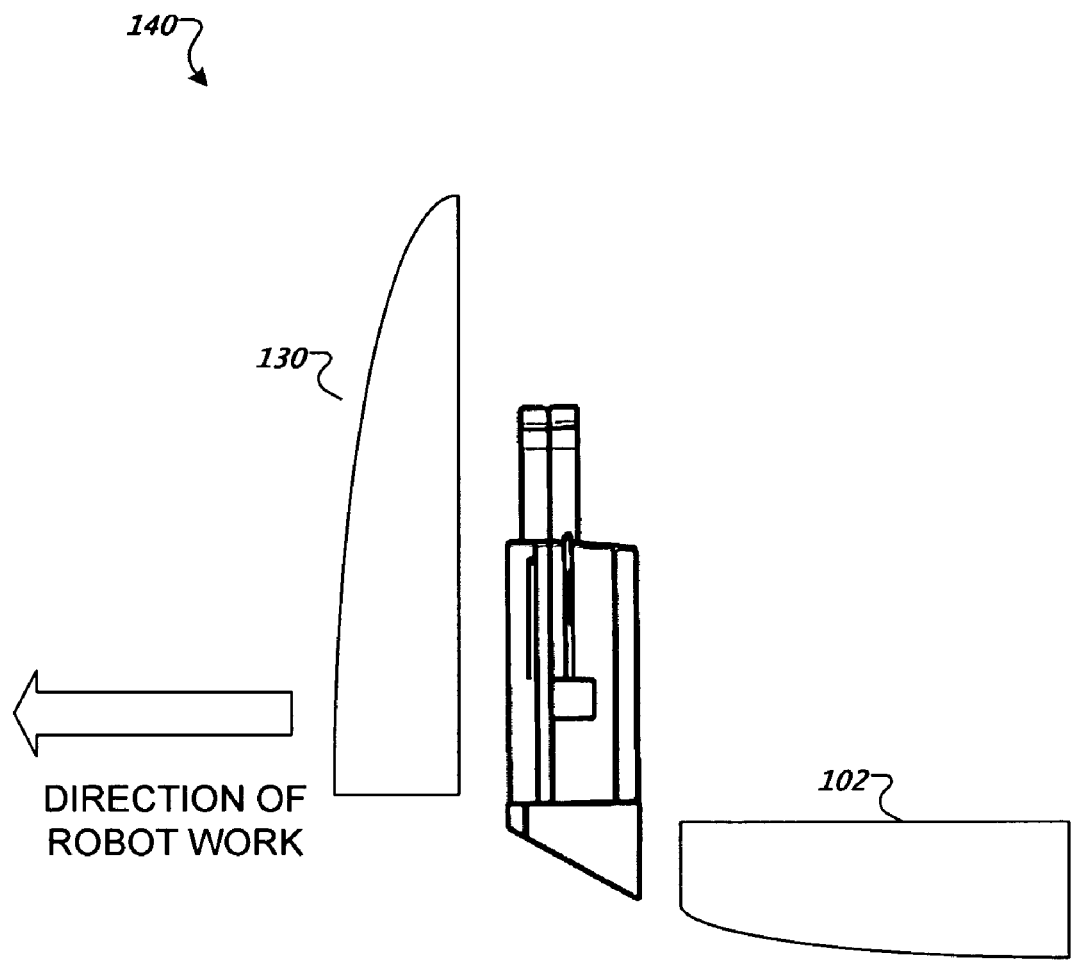
FIGS. 11 and 12 show side and exploded views of a floor proximity sensor.
Figure 12:
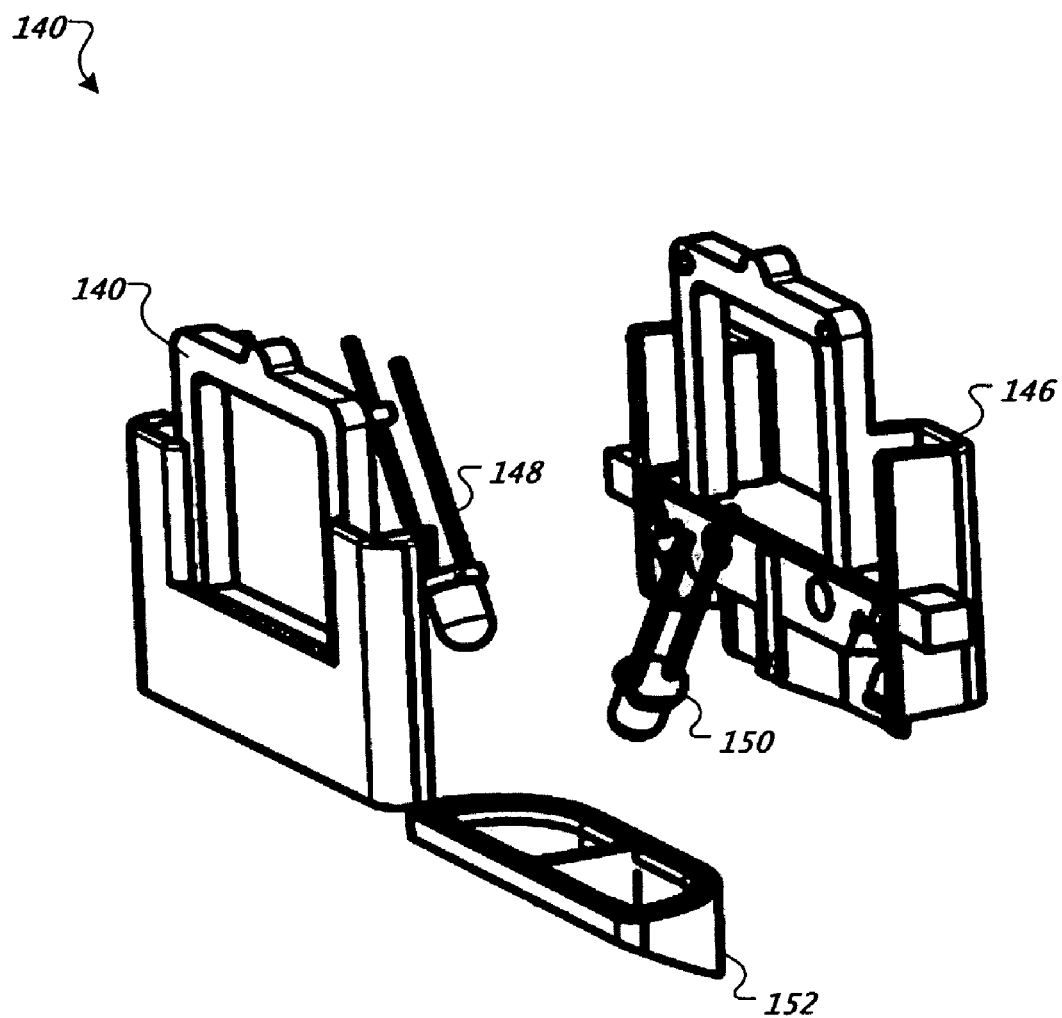

FIGS. 11 and 12 show side and exploded views of a floor proximity sensor 140. Floor proximity sensor 140 has a body with a forward section 144, a rear section 146, an emitter 148, a receiver 150, and a cover 152. Emitter 148 and receiver 150 may be capable of emitting and receiving infrared light. Emitter 148 and receiver 150 are arranged within the forward and rear body sections 144, 146 at an angle so that their axes line up at a point beneath robot 100 at the approximate floor distance.

Figure 13:
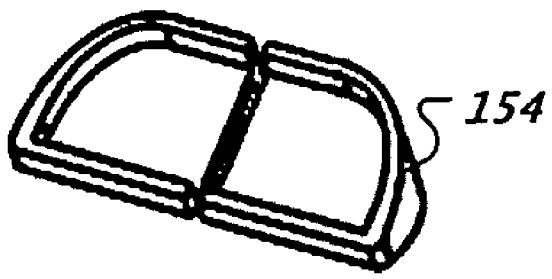
FIG. 13 shows an exploded view of a cover used with the floor proximity sensor shown in FIGS. 11 and 12.
Figure 13:
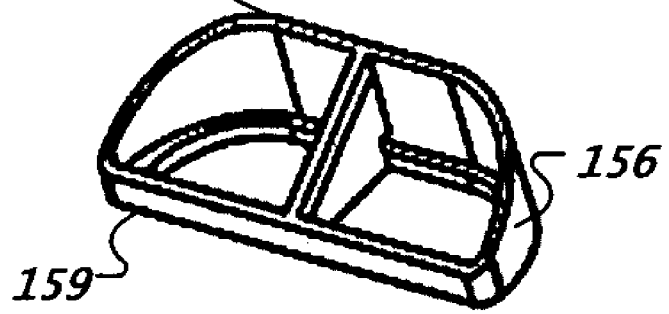

FIG. 13 shows an exploded view of cover 152. Cover 152 consists of a lens 154 and a cover body 156. Lens 152 may be transparent to infrared light and cover body 156 may be opaque to facilitate focusing emissions sent from emitter 148. The forward edge 158 of cover 152 is elevated above its rearward edge 159 to aid in reducing dust build up and to ensure that light is received by receiver 150 primarily when sensor 140 is positioned correctly over a floor and a reduced amount is received when sensor 140 is over a "cliff". In some implementations, cover 152 is constructed using a material with anti-static (dissipative or conductive) properties, such as an anti-static polycarbonate, copper oxide doped or coated polycarbonate, anti-static Lexan "LNP" available from General Electric, Inc., anti-static polyethylene, anti-static ABS/polycarbonate alloy, or other like material. One example includes ABS 747 and PC 114R or 1250Y mixed with anti-static powder. Preferably, the robot shell, chassis, and other parts are also anti-static (e.g., antistatic ABS), dissipative and/or conductive, at least in part in order to ground the anti-static cover 152. The cover 152 may also be grounded by any conductive path to ground. When the coverage robot 100 traverses a floor, a cover 152 with out anti-static properties can become electrostatically charged (e.g., via friction), thereby having a propensity to accumulate oppositely charged debris, such as fuzz, which may obstructing a sensing view of the emitter 148 and receiver 150.

In cases where the floor proximity sensor 140 is properly placed on a floor, light emitted from emitter 148 reflects off the floor and back to receiver 150, resulting in a signal that is readable by controller 108. In the event that the floor proximity sensor 140 is not over a floor, the amount of light received by receiver 150 is reduced, resulting in a signal that may be interpreted by controller 108 as a cliff.

Figure 14:
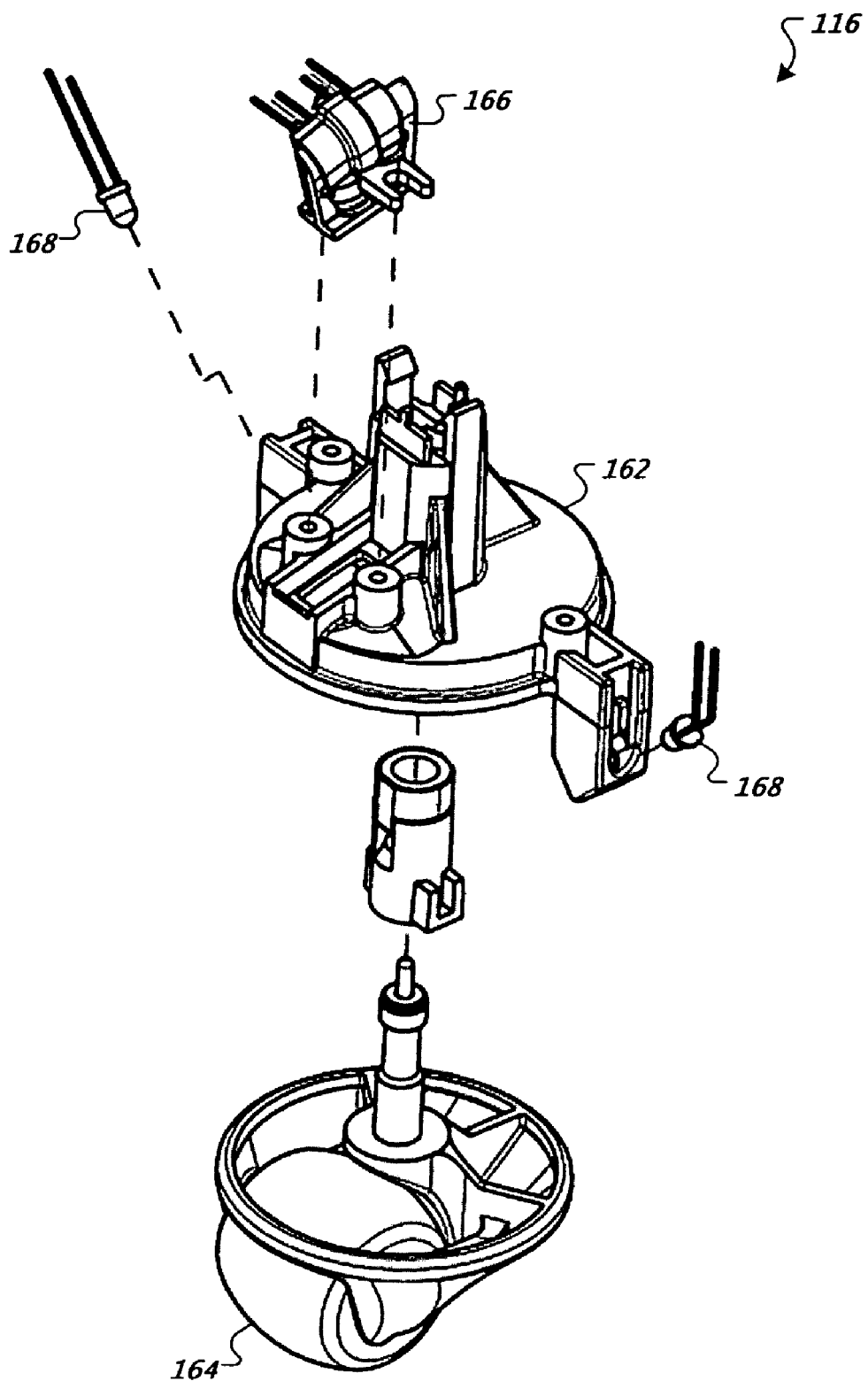
FIG. 14 is an exploded view showing an example of a caster wheel assembly.

FIG. 14 is an exploded view showing an example of the caster wheel assembly 116. Caster wheel assembly 116 is separately and independently removable from the chassis 102 and the coverage robot 100. The caster wheel assembly 116 includes a caster wheel housing 162, a caster wheel 164, a wheel-drop sensor 166, and a wheel-floor proximity sensor 168.

The caster wheel housing 162 carries the caster wheel 164, the wheel drop sensor 166, and wheel-floor proximity sensor 168. The caster wheel 164 turns about a vertical axis and rolls about a horizontal axis in the caster wheel housing 162.

The wheel drop sensor 166 detects downward displacement of the caster wheel 164 with respect to the chassis 102. The wheel drop sensor 166 determines if the caster wheel 164 is in contact with the work surface.

The wheel-floor proximity sensor 168 is housed adjacent to the caster wheel 164. The wheel-floor proximity sensor 168 detects the proximity of the floor relative to the chassis 102. The wheel-floor proximity sensor 168 includes an infrared (IR) emitter and an IR receiver. The IR emitter produces an IR signal. The IR signal reflects off of the work surface. The IR receiver detects the reflected IR signal and determines the proximity of the work surface. Alternatively, the wheel-floor proximity sensor 168 may use another type of sensor, such as a visible light sensor. The wheel-floor proximity sensor 808 prevents the coverage robot 100 from moving down a cliff in the work surface, such as a stair step or a ledge. In certain implementations, the drive wheel assemblies 114, 116 each include a wheel-floor proximity sensor.

Figure 15:
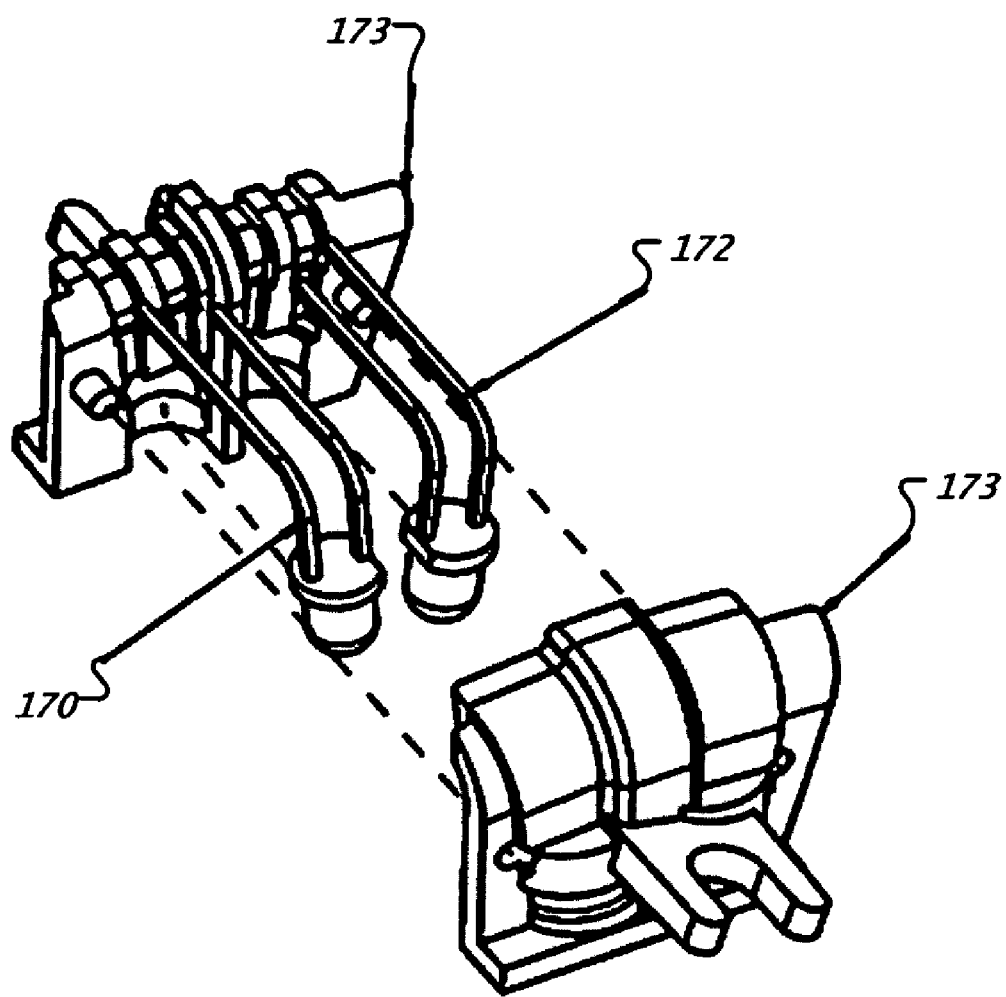
FIG. 15 is an exploded view showing an example of a wheel-drop sensor.

FIG. 15 is an exploded view showing an example of the wheel-drop sensor 166. The wheel drop sensor 166 includes an IR emitter 170 and an IR receiver 172 in a housing 173. The IR emitter 170 produces an IR signal. The IR signal reflects from the caster wheel 164. The IR receiver 172 detects the reflected IR signal and determines the vertical position of the caster wheel 164.

Figure 16:
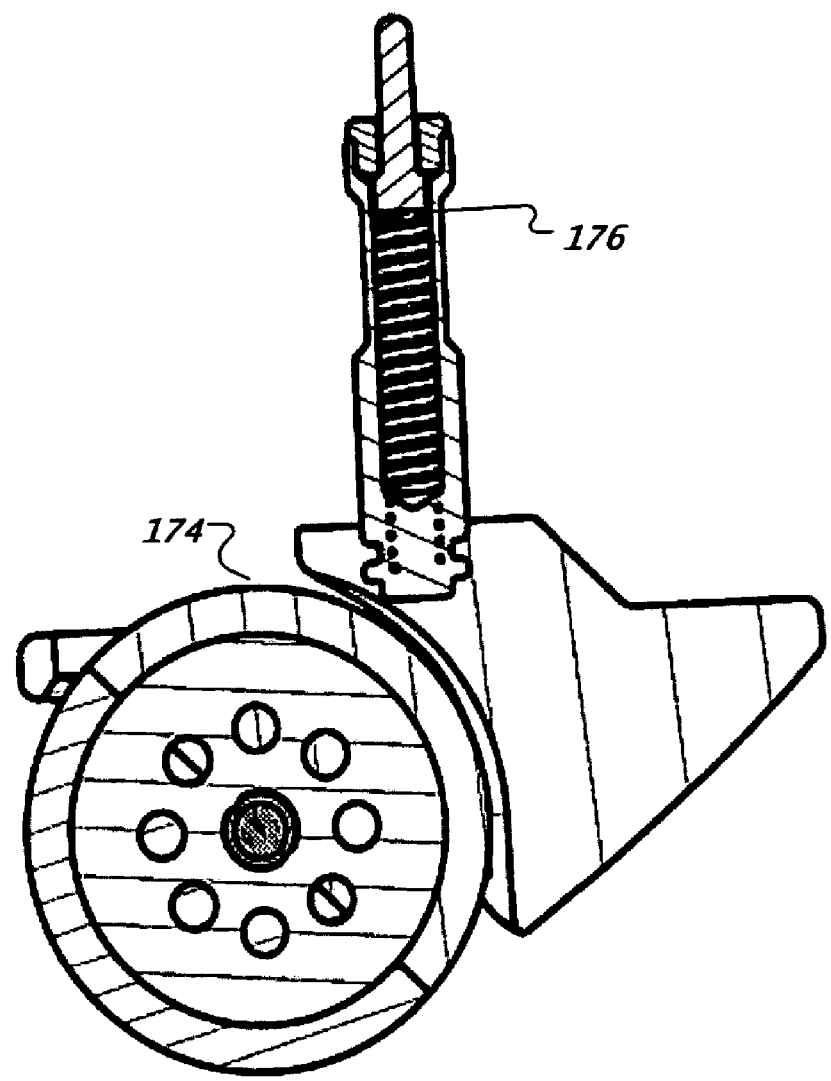
FIG. 16 is a cross-sectional view showing an example of a caster wheel assembly.

FIG. 16 is a cross-sectional view showing an example of the caster wheel assembly 116. The view shows a top surface 174 of the caster wheel 164 from which the IR signal reflects. The IR receiver 172 uses the reflected IR signal to determine the vertical position of the caster wheel 164.

In some instances, drive system 104 may further include a validation system that validates the operability of the floor proximity sensors when all wheels drop. The validation is based on the inference that all wheels dropped are likely the result of a robot being lifted off the floor by a person, and checks to see that all floor proximity sensors do not register a floor surface (either no reflection measured, or a reflection that is too strong). Any sensor that registers a floor surface or a too strong reflection (e.g., indicating a blocked sensor) is considered blocked. In response to this detection, the robot may initiate a maintenance reporting session in which indicia or lights indicate that the floor proximity sensors are to be cleaned. In response to this detection, the robot will prohibit forward motion until a validation procedure determines that all floor proximity sensors are clear and are functional. For example, a mechanical switch sensor may be positioned above castor wheel 168 at a location 176 that causes it to close when the castor is depressed (e.g. it is pushed upwards by the floor), thus providing a alternate signal to controller 108 that castor wheel 164 is on the floor.

Occasionally, an autonomous coverage robot may find itself entangled with an external object, such as frills on the end of a rug or shoe laces dangling from a untied shoe. A method of disentangling an autonomous coverage robotic (such as robot 100) may initially include placing robot 100 on a floor surface, which should be considered to include instances when the robot starts itself from a dock (e.g., after a significant delay, but nonetheless having been placed on the floor). Robot 100 autonomously moves forward across the floor surface while operating the cleaning heads 106a, 106b. Robot 100 may reverse bias edge cleaning head motor 118 in response to a measured increase (e.g., spike or increase above threshold, rapid increase of a predetermined slope) in motor current while continuing to maneuver across the floor surface in an unchanged direction, working and/or cleaning the floor without interruption.

In some instances, robot 100 may move forward before (independently of forward motion control by the motion behaviors) reverse biasing the rotation of edge cleaning head 106a in response to an elevated cleaning head motor current. Robot 100 may independently reverse the rotation of edge cleaning head 106a in response to an increased edge cleaning head 106a motor current for a period of time. The time period for increased current may be specified, for instance, in seconds. After reverse biasing the rotation of edge cleaning head 106, robot 100 may move in a reverse direction, alter its direction of travel, and move in the new direction.

In particular combination, the robot includes a main cleaning head 106b extending across the middle of the robot, e.g., in a direction transverse to the robot working path or substantially in a direction parallel to the main drive wheels, as well as an edge cleaning head which is arranged at the lateral side of the robot, in a position to extend the edge cleaning head beyond the perimeter of the robot in the side direction so as to clean beside the robot (as opposed to solely underneath the body of the robot). The main cleaning head 106b includes at least one rotationally driven brush 111, and the edge cleaning head 106a includes at least one rotationally driven brush 120.

Figure 9B:
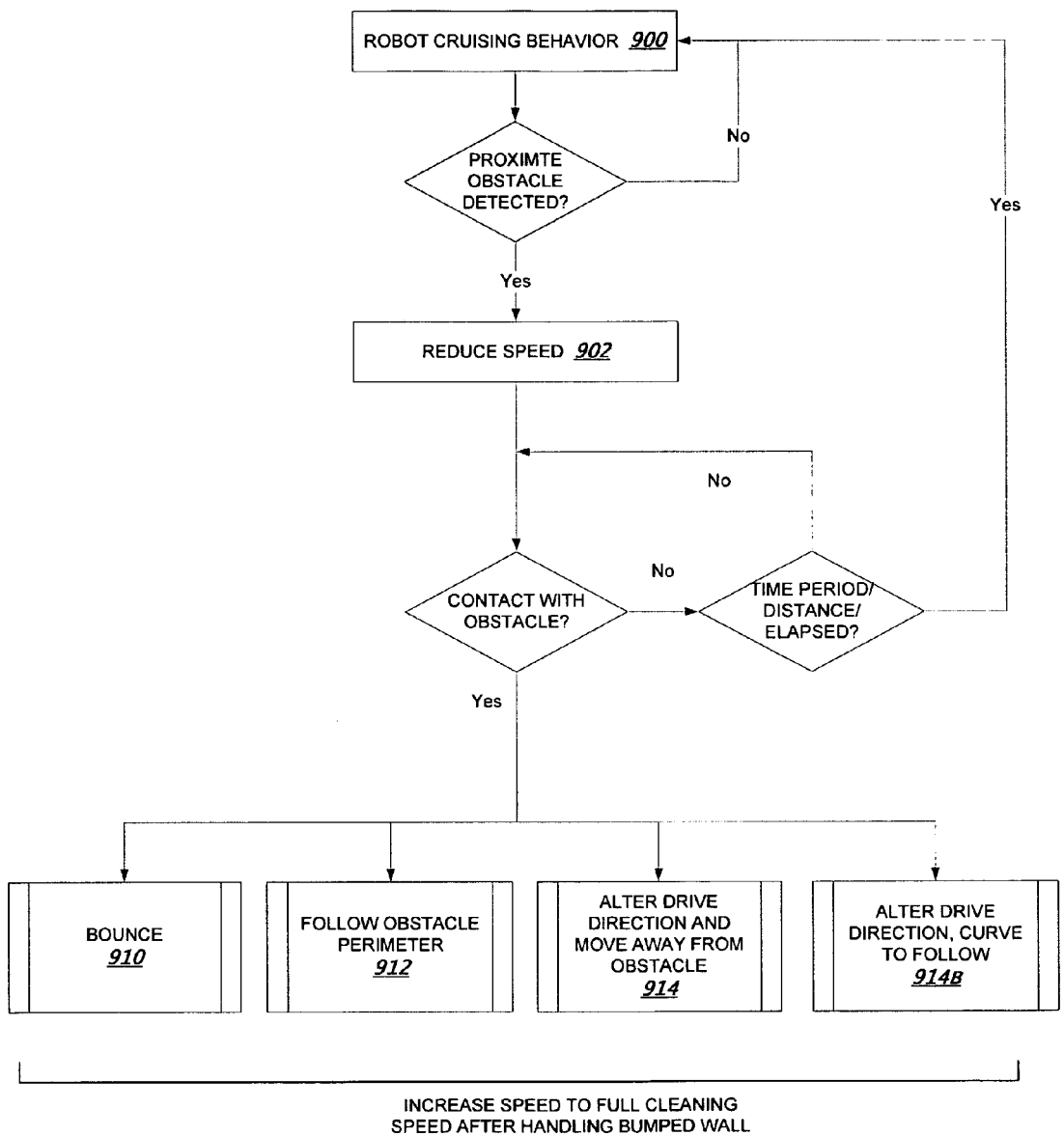
FIGS. 9B and 9C show flow charts describing motion control and brush operation.
Figure 9C:
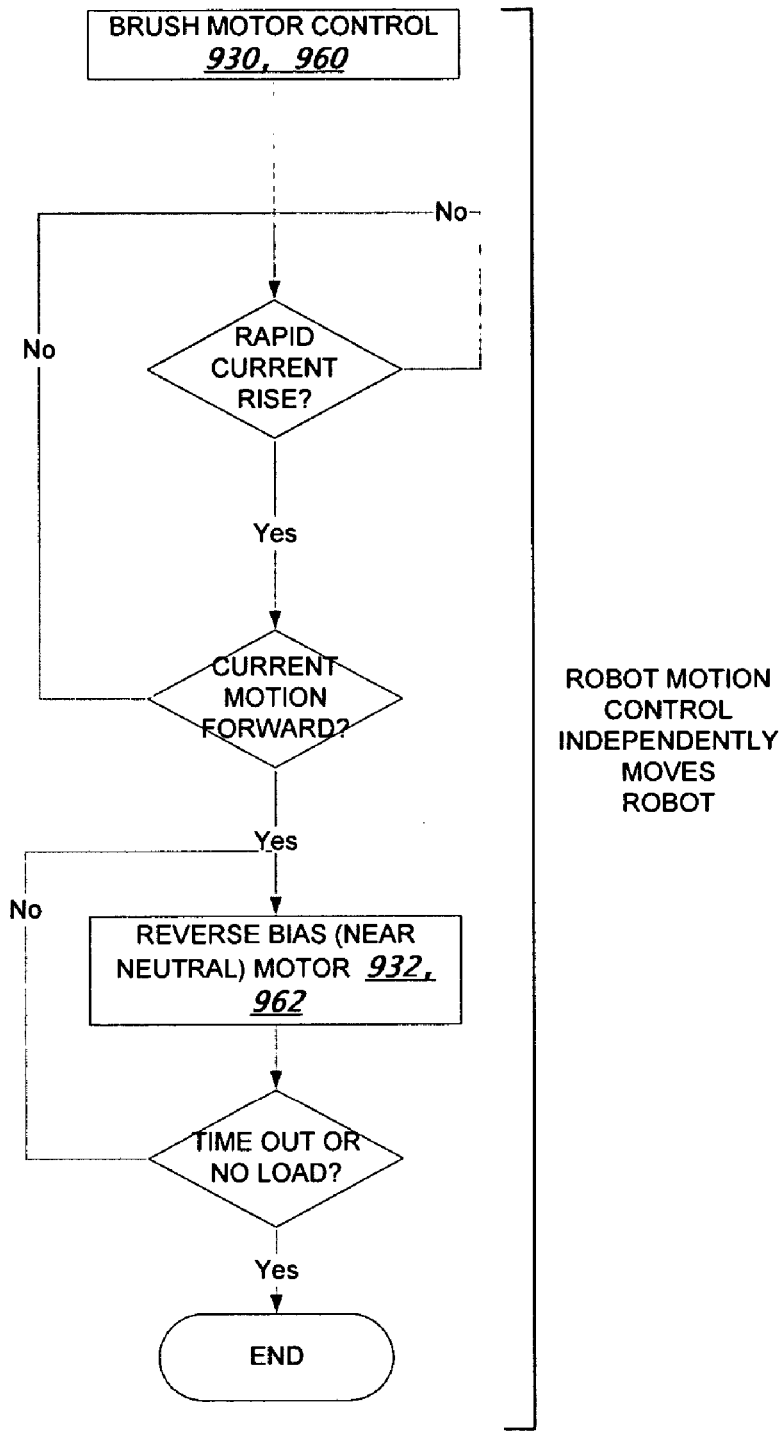

As shown in FIG. 9C, the main cleaning head 106b is controlled by, e.g., a brush motor control process 930. The brush motor control process monitors a current sensor of the main cleaning head motor, and when a rapid current rise occurs (e.g., spike or rise above threshold, integrated or otherwise determined slope of a predetermined amount), optionally checks if the robot is moving forward (e.g., by monitoring a process, a flag indicating forward motion, or the main drive motors directly). If the robot 100 is moving forward, without interrupting such motion (optionally isolated from the capability to do so as the robot motion is controlled by independent behaviorally controlled drive), the brush motor control process 930 applies a reverse bias to the brush motor.

The reverse bias does not rapidly rotate the motor in the reverse direction so as to avoid winding the same entangled cord, string, or tassel about the brush in the opposite direction. Instead, the brush motor control process 930 applies a slight bias, sufficient to keep the rotation of the brush near neutral. When the robot 100 moves forward, the cord, string, or tassel pulling on the brush to unwind the entanglement will only transmit an attenuated torque in the reverse direction to the motor (e.g., because of a reduction gearbox between the motor and brush permitting back-driving the gearbox at a reversed mechanical advantage), but, combined with the reverse bias, the attenuated torque results in assisted but slow unwinding of the entangled brush, of increasing speed as more tension is applied by the cord or string, e.g., as the robot moves further away from the site where the cord or string or tassel is fixed.

The reverse bias continues until a time out or until no pulling or jamming load (e.g., no entanglement) is detected on the motor, whereupon the process ends and the cleaning head resumes normal rotation in a direction to clean the surface.

The edge brush 120 of the edge cleaning head 106a is subject to substantially the same control in an edge brush motor control process 960, in which the edge brush 120 rotation is reverse biased 962 in a similar fashion (also shown in FIG. 9B).

Accordingly, both main 106b and edge 106a brushes are controlled independently of one another and of robot motion, and each may disentangle itself without monitoring or disturbing the other. In some instances, each will become simultaneously entangled, and independent but simultaneous control permits them to the unwound or self-clearing at the same time. In addition, by having the brush motor under reactive control (not awaiting a drive motor state or other overall robot state) and with only a slight reverse bias, the brush will be available to unwind as soon as any rapid current rise is detected, catching an entanglement earlier, but will not move in reverse by any amount sufficient to cause a similar entangling problem in the opposite direction.

In some instances, because the motion control is independent of and does not monitor the brush state, the robot 100 continues to move forward and the cleaning head 106b begins to reverse bias the rotation of main cleaning head 111 after the robot 100 has proceeded some amount forward. In some instances, robot 100 may reverse the rotation of main cleaning head 111 in response to an elevated cleaning head motor current for a period of time. After reversing the rotation of main cleaning head 111, robot 100 may move in a reverse direction, alter a drive direction, and move in the drive direction.

FIGS. 17 A-H illustrate examples of methods for disentangling coverage robots with various configurations of cleaning heads. In general, the cleaning heads have rollers which may be driven by electric motors. Dirt and debris may be picked up by the cleaning heads and deposited in a container for later manual or automatic disposal. Electronic control devices may be provided for the control of drive motors for changing the coverage robot's direction, and also for the control of agitating brush rollers. Such methods may allow coverage robots to resume cleaning unattended after encountering an entanglement situation.

FIG. 17A shows a side view of a cleaning head 201 of a coverage robot 200 with an agitating roller 202 in tangential contact with the work surface. Roller 202 brushes up dirt 203 towards a suction duct 204 which is integrated within a brush chamber 206. By using an air suction stream, the collected debris 210 may be conveyed to a container 212.

If the movement of rollers 202 is blocked or obstructed to a predetermined or a settable extent, the cleaning head 201 may be stopped, allowing robot 200 to reverse direction with roller 202 minimally powered in the reverse direction sufficiently enough to release the obstruction. For example, if a cord has become wound about roller 202, the roller 202 may be disengaged and allowed to turn so that the cord unwinds as robot 200 retreats. Robot 200 may then resume operation of roller 202 in the original direction of rotation and resume robot motion in the original direction.

FIG. 17B shows another example of disentanglement using robot 200 with the addition of a brush roller 214. Brush roller 214 may be driven by the same or a different motor and rotate normal to the working surface. Brush roller 214 sends dirt 216 from the edges of robot 200 to a pickup area 218 of roller 202.

In this example, if the movement of either rollers 202 or 212 is blocked or obstructed to a predetermined or a settable extent, cleaning head 201 may be stopped, allowing robot 200 to reverse direction with rollers 202, 212 minimally powered in the reverse direction sufficiently enough to release the obstruction. For example, if a cord becomes wound about either roller 202 or 212, the roller 202 or 212, or both, may be disengaged and allowed to turn so that the cord unwinds as robot 200 retreats. Robot 200 may then resume operation of rollers 202, 212 in the original direction of rotation and resume robot motion in the original direction.

FIG. 17C shows a below view of a coverage robot 240 and a side view of a cleaning head 242 within it. A first brush roller 244 and a second brush roller 246 are in tangential contact with the work surface. Rollers 244 and 246 may be rotated by a single or multiple motors for the purpose of agitating the work surface and dynamically lifting debris 248 trapped between them, towards a suction duct 250 which is integrated within brush chamber 252. By means of an air suction stream 254, the collected debris 256 may be conveyed to a container 258.

If the movement of rollers 244, 246 is blocked or obstructed to a predetermined or a settable extent, rollers 202, 212 may be stopped, allowing robot 240 to advance forward, as shown by arrow 260, with the rollers 202, 212 minimally powered in the reverse direction sufficiently enough to release obstruction, and resume operation of the roller motor in the original direction of rotation.

FIG. 17D shows robot 240 performing an alternate example method for disentanglement. If the movement of the agitating rollers 244, 246 is blocked or obstructed to a predetermined or a settable extent, the rollers 244, 246 may be disengaged (i.e. not actively driven). Robot 240 may then reverse directions, as shown by arrow 262, with rollers 244, 246 minimally powered in the reverse direction sufficiently enough to release the obstruction, upon which rollers 244 246 may be reengaged in their original direction of rotation and robot 240 resumes driving in its original direction (shown by arrow 264).

FIG. 17E shows a side view of a coverage robot 270 with three rollers. Robot 270 has a cleaning head 272 and a side brush 274. Cleaning head 272 has a normal agitating roller 276 and a counter-rotating agitating roller 278. Agitating rollers 276 and 278 may be rotationally driven parallel to each other and to the work surface and brush roller 274 may be driven normally to the work surface by electric motor(s) (not shown). Brush roller 274 may pre-sweep the work surface and pushing dirt and debris towards the agitating rollers 276, 278, as shown by arrow 279. Agitating rollers 276, 278 may push dirt 280 towards a suction duct 282 which is integrated within a brush chamber 284. By using an air suction stream, the collected debris 288 may be conveyed to a container 290.

If the movement of agitating rollers 276, 278 is blocked or obstructed to a predetermined or a settable extent, the roller motor(s) may be stopped or temporarily activated in the opposite direction in an attempt to remove the blockage or obstruction. The roller motor(s) may then resume operation in the original direction of rotation.

FIG. 17F illustrates another example of a method for disentangling coverage robot 270. If the movement of agitating rollers 276, 278 is blocked or obstructed to a predetermined or a settable extent, the roller motor(s) may be stopped or temporarily activated in the opposite direction. The roller motor(s) may then resume driving rollers 276, 278 in the original direction of rotation while simultaneously reversing the direction of travel of robot 270 or imparting a twisting motion about its axis. Robot 270 may then resume motion in the original direction.

FIG. 17G shows a side view and a bottom view of a coverage robot 300 with two rollers and two air ducts. Robot 300 has a cleaning head 302 a normal agitating roller 304 and a counter-rotating agitating roller 306. Agitating rollers 304 and 306 may be rotationally driven parallel to each other and to the work surface by electric motor(s) (not shown).

Rollers 304, 306 may dynamically lift and push dirt and debris 307 towards a primary air duct 308 which is integrated within a brush chamber 312. Dirt and debris that are passed over by rollers 304, 306 may encounter a secondary air duct 310 located be hind the rollers. A suction stream generated by an air suction motor (not shown) may convey the collected dirt and debris via the ducts 308, 210 to a container 314. Associated electronic control devices provide control to drive motors for turning and changing direction of robot 300, and also for directional control of the agitating rollers 304, 306.

If the movement of the agitating rollers 304, 306 is blocked or obstructed, then the control device do one or more of stopping or minimally powering the roller motor(s) in the reverse direction, then resume operating the roller motor in the original direction of rotation. Simultaneously, robot 300 may at least momentarily reverse its direction or imparting a twisting motion about its axis and then resuming motion in its original direction.

FIG. 17H shows another example of a disentangling method, involving robot 300 with the addition of a brush roller 316. Brush roller 316 has an axis of rotation normal and may be driven by an existing or dedicated electric motor. Brush roller 316 may pre-sweep the work surface and push dirt and debris 318 towards the agitating rollers 304, 306 (as shown by arrow 318). Dirt and debris may then be removed as described above.

If the movement of the agitating rollers 304, 306 is blocked or obstructed, the control device may stop or minimally power the roller motor(s) in the reverse direction reverse, then resume operating the roller motor in the original direction of rotation. Simultaneously, robot 300 may at least momentarily reverse its direction or imparting a twisting motion about its axis and then resuming motion in its original direction.

Other robot details and features combinable with those described herein may be found in the following U.S. patent applications filed concurrently herewith, entitled "AUTONOMOUS COVERAGE ROBOT NAVIGATION SYSTEM" having assigned Ser. No. 11/633,869; "MODULAR ROBOT" having assigned Ser. No. 11/633,886; and "ROBOT SYSTEM" having assigned Ser. No. 11/633,883, the entire contents of the aforementioned applications are hereby incorporated by reference.

A number of implementations have been described. Nevertheless, it will be understood that various modifications may be made without departing from the spirit and scope of the following claims. Accordingly, other implementations are within the scope of the following claims.

What is claimed is:

1. An autonomous coverage robot comprising:
   a chassis;
   a drive system mounted on the chassis and configured to maneuver the robot;
   an edge cleaning head carried by the chassis and driven by an edge cleaning head motor to rotate about a non-horizontal axis, the edge cleaning head extending beyond a lateral extent of the chassis to engage a floor surface while the robot is maneuvered across the floor;
   a controller carried by the chassis;
   a motor current sensor in communication with the controller and configured to monitor motor current associated with the edge cleaning head;
   wherein the controller is configured to reverse bias the motor current to the edge cleaning head motor, in response to an elevated motor current, sufficient to provide substantially free reverse rotation of the edge cleaning head motor, while continuing to maneuver the robot across the floor.

2. The robot of claim 1 wherein the controller, in response to an elevated edge cleaning head motor current, moves the robot backwards, alters a drive direction, and then moves the robot forward.

3. The robot of claim 1 wherein the edge cleaning head comprises a brush with bristles.

4. The robot of claim 1 wherein the edge cleaning head rotates about a substantially vertical axis.

5. The robot of claim 1 wherein the edge cleaning head comprises at least one brush element having first and second ends and defining an axis of rotation about the first end normal to the work surface.

6. The robot of claim 5 wherein the edge cleaning head comprises three brush elements, each brush element forming an angle with an adjacent brush element of about 120 degrees.

7. The robot of claim 5 wherein the edge cleaning head comprises six brush elements, each brush element forming an angle with an adjacent brush element of about 60 degrees.

8. The robot of claim 1 wherein the edge cleaning head is disposed on a peripheral edge of the robot.

9. The robot of claim 1 wherein the edge cleaning head comprises a rotatable squeegee that extends beyond a peripheral edge of the chassis.

10. The robot of claim 1 wherein the edge cleaning head comprises a plurality of absorbent fibers that extend beyond a peripheral edge of the chassis upon rotation of the cleaning head.

11. The robot of claim 1 further comprising a main cleaning head carried by the chassis and driven to rotate about a horizontal axis to engage a floor surface while the robot is maneuvered across the floor, wherein the controller is configured to reverse bias the motor current to the main cleaning head in response to an elevated main cleaning head motor current, while continuing to maneuver the robot across the floor.

12. The robot of claim 11 wherein the controller, in response to an elevated main cleaning head motor current, moves the robot backwards, alters a drive direction, and then moves the robot forward.

13. A method of disentangling an autonomous coverage robotic, the method comprising:
   running the robot to autonomously traverse across a floor surface in a forward direction of the robot while rotating about a non-horizontal axis an edge cleaning head carried by the chassis and driven by an edge cleaning head motor, the edge cleaning head extending beyond a lateral extent of the chassis while engaging the floor surface;
   monitoring motor current associated with the edge cleaning head;
   reverse biasing the motor current to the edge cleaning head motor, in response to detecting an elevated edge cleaning head motor current, sufficient to provide substantially free reverse rotation of the edge cleaning head motor, while continuing to maneuver across the floor surface.

14. The method of claim 13 wherein the robot determines movement of the robot in the forward direction before reverse biasing the motor current to the edge cleaning head in response to an elevated cleaning head motor current.

15. The method of claim 13 wherein the robot reverse biases the motor current to the edge cleaning head in response to an elevated edge cleaning head motor current for a period of time.

16. The method of claim 15 wherein the period of time is about 2 seconds.

17. The method of claim 13 wherein the robot, after reverse biasing the motor current to the edge cleaning head, moves in a reverse direction, alters a drive direction, and then moves in the drive direction.

18. The method of claim 13 wherein the edge cleaning head comprises a brush with bristles.

19. The method of claim 13 wherein the robot further comprises a main cleaning head carried by the chassis and driven to rotate about a horizontal axis to engage the floor surface while the robot is maneuvered across the floor, wherein the robot reverse biases the motor current to the main cleaning head in response to an elevated main cleaning head motor current while continuing to maneuver across the floor surface.

20. The method of claim 19 wherein the robot determines movement of the robot in the forward direction before reverse biasing the motor current to the main cleaning head in response to an elevated main cleaning head motor current.

21. The method of claim 19 wherein the robot reverse biases the motor current to the main cleaning head in response to an elevated cleaning head motor current for a period of time.

22. The method of claim 19 wherein the robot, after reverse biasing the motor current to the main cleaning head, moves in a reverse direction, alters a drive direction, and then moves in the drive direction.

23. An autonomous robot comprising:
   a chassis;
   a drive system mounted on the chassis and configured to maneuver the robot;
   a floor proximity sensor carried by the chassis and configured to detect an adjacent floor surface, the sensor comprising:
      a beam emitter configured to direct a beam toward the floor surface; and
      a beam receiver responsive to a reflection of the directed beam from the floor surface and mounted in a downwardly-directed receptacle of the chassis; and
   a beam-transparent cover having a forward and rearward edge disposed across a lower end of the receptacle to prohibit accumulation of sediment in the receptacle, the forward edge elevated above the rearward edge;
   wherein the cover comprises an anti-static material.

24. The robot of claim 23 wherein the floor proximity sensor comprises at least one infrared emitter and receiver pair.

25. The robot of claim 23 wherein the drive system comprises:
   at least one driven wheel suspended from the chassis; and
   at least one wheel-floor proximity sensor carried by the chassis and housed adjacent one of the wheels, the wheel-floor proximity sensor configured to detect the floor surface adjacent said one of the wheels.

26. The robot of claim 25 wherein the wheel-floor proximity sensor comprises at least one infrared emitter and receiver pair.

27. The robot of claim 23 wherein the drive system further comprises a controller configured to maneuver the robot away from a perceived cliff in response a signal received from the floor proximity sensor.

28. The robot of claim 23 wherein the drive system further comprises:
   a wheel drop sensor housed near one of the wheels and responsive to substantial downward displacement of the wheel with respect to the chassis.

29. The robot of claim 28 wherein the drive system further comprises a validation system that validates the operability of the floor proximity sensors when all wheels drop.

30. The robot of claim 28 wherein the wheel drop sensor comprises at least one infrared emitter and receiver pair.

31. The robot of claim 23 wherein the lower surface of the receptacle is wedge shaped.

32. The robot of claim 23 wherein the cover comprises a lens.

* * * * *

UNITED STATES PATENT AND TRADEMARK OFFICE
CERTIFICATE OF CORRECTION

PATENT NO.       : 7,441,298 B2  
APPLICATION NO.  : 11/633885  
DATED            : October 28, 2008  
INVENTOR(S)      : Selma Svendsen et al.

It is certified that error appears in the above-identified patent and that said Letters Patent is hereby corrected as shown below:

Column   Line    Description of Error  
17       67      In claim 1, after "chassis," insert --and--

Signed and Sealed this

Twentieth Day of January, 2009

JON W. DUDAS  
*Director of the United States Patent and Trademark Office*